(12) United States Patent
Nagasaka

(10) Patent No.: US 10,795,641 B2
(45) Date of Patent: Oct. 6, 2020

(54) INFORMATION PROCESSING DEVICE AND INFORMATION PROCESSING METHOD

(71) Applicant: SONY CORPORATION, Tokyo (JP)

(72) Inventor: Hideo Nagasaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/094,712

(22) PCT Filed: May 11, 2017

(86) PCT No.: PCT/JP2017/017935
§ 371 (c)(1),
(2) Date: Oct. 18, 2018

(87) PCT Pub. No.: WO2018/034028
PCT Pub. Date: Feb. 22, 2018

(65) Prior Publication Data
US 2019/0163437 A1 May 30, 2019

(30) Foreign Application Priority Data

Aug. 16, 2016 (JP) .................................. 2016-159668

(51) Int. Cl.
*G06F 3/048* (2013.01)
*G06F 3/16* (2006.01)
*G06Q 30/06* (2012.01)
*G06F 3/01* (2006.01)
*G06F 3/0484* (2013.01)
(Continued)

(52) U.S. Cl.
CPC ............... *G06F 3/167* (2013.01); *G06F 3/01* (2013.01); *G06F 3/0482* (2013.01); *G06F 3/0484* (2013.01); *G06Q 30/06* (2013.01); *G10L 15/22* (2013.01); *G06Q 30/0601* (2013.01); *G10L 2015/223* (2013.01)

(58) Field of Classification Search
CPC ............ G06F 3/048; G06F 3/01; G06F 3/167; G06Q 30/06; G10L 15/22; G10L 2015/223
See application file for complete search history.

(56) References Cited

U.S. PATENT DOCUMENTS

2004/0044523 A1 3/2004 Sakai et al.
2012/0284105 A1* 11/2012 Li ......................... G06Q 30/02
705/14.23
2013/0024815 A1* 1/2013 O ........................ G06F 3/04817
715/811

(Continued)

FOREIGN PATENT DOCUMENTS

CN 1537267 A 10/2004
EP 2801890 A1 11/2014
(Continued)

OTHER PUBLICATIONS

Extended European Search Report of EP Application No. 17841256. 5, dated Apr. 23, 2019, 09 pages.

(Continued)

*Primary Examiner* — Xuyang Xia
(74) *Attorney, Agent, or Firm* — Chip Law Group

(57) ABSTRACT

An information processing device, including an acquiring unit that acquires collected speech and a process executing unit that performs a predetermined process on the basis of the acquired collected speech and a plurality of display objects in a first display range, the first display range includes a current display range.

12 Claims, 25 Drawing Sheets

(51) Int. Cl.
*G06F 3/0482* (2013.01)
*G10L 15/22* (2006.01)

(56) References Cited

U.S. PATENT DOCUMENTS

| | | | | |
|---|---|---|---|---|
| 2014/0250120 A1* | 9/2014 | Mei | ............... | G06F 3/0488 |
| | | | | 707/736 |
| 2014/0337740 A1* | 11/2014 | Kwon | ............ | G06F 3/04817 |
| | | | | 715/728 |
| 2015/0242932 A1* | 8/2015 | Beguin | ........... | G06Q 30/0633 |
| | | | | 705/26.8 |
| 2015/0248886 A1* | 9/2015 | Sarikaya | ........ | G06F 16/3329 |
| | | | | 704/257 |
| 2015/0381885 A1* | 12/2015 | Kim | .............. | G06F 3/011 |
| | | | | 348/207.1 |

FOREIGN PATENT DOCUMENTS

| | | |
|---|---|---|
| JP | 03-62293 A | 3/1991 |
| JP | 06-110486 A | 4/1994 |
| JP | 2001-092845 A | 4/2001 |
| JP | 2005-500591 A | 1/2005 |
| JP | 2005-322148 A | 11/2005 |
| KR | 10-2014-0132246 A | 11/2014 |
| WO | 02/077790 A2 | 10/2002 |

OTHER PUBLICATIONS

International Search Report and Written Opinion of PCT Application No. PCT/JP2017/017935, dated Jun. 20, 2017, 10 pages of ISRWO.

* cited by examiner

FIG. 2

| SCENE | SPEECH | PROCESS ON SPEECH |
|---|---|---|
| STATE OTHER THAN EC APPLICATION | "I WANT TO BUY XXX" | START UP EC APPLICATION AND DISPLAY SEARCH RESULT |
| | "I WANT TO START UP EC APPLICATION AND SHOP" | START UP EC APPLICATION |
| | ⋮ | ⋮ |
| SEARCH RESULT DISPLAY SCREEN | "NARROW DOWN WITH XXX" | NARROW DOWN PRODUCTS WITH "CLASSIFICATION" AND "KEYWORD" |
| | "REARRANGE WITH XXX" | REARRANGE PRODUCTS IN "ORDER FROM LOW PRICE" OR THE LIKE |
| | ⋮ | ⋮ |
| PRODUCT DETAILS SCREEN | "I'LL BUY THIS" | ADD PRODUCT BEING DISPLAYED TO CART |
| | "SHOW ME MY CART" | TRANSITION TO CART SCREEN |
| | ⋮ | ⋮ |

| PRODUCT NAME | VOLUME | UNIT | PRICE | |
|---|---|---|---|---|
| GYB XYZ 350ml<br>1 PACK (6 CANS) | 350ml | 1 PACK (6 CANS) | ¥1,000 | PER CAN ¥166.6<br>ADD TO CART |
| GYB XYZ 350ml<br>1 BOX (24 CANS) | 350ml | 1 BOX (24 CANS) | ¥3,000 | PER CAN ¥125<br>ADD TO CART |
| GYB XYZ 350ml<br>1 SET (48 CANS) | 350ml | 1 SET<br>(48 CANS: 24 CANS × 2 BOXES) | ¥5,500 | PER CAN ¥114.6<br>ADD TO CART |
| ... | | | | |

LIKE TO HAVE 6 CANS

FIG. 13

| PRODUCT NAME | VOLUME | UNIT | PRICE |
|---|---|---|---|
| GYB XYZ 350ml 1 PACK (6 CANS) | 350ml | 1 PACK (6 CANS) | ¥1,000  PER CAN ¥166.6  ADD TO CART |
| GYB XYZ 350ml 1 BOX (24 CANS) | 350ml | 1 BOX (24 CANS) | ¥3,000  PER CAN ¥125  ADD TO CART |
| GYB XYZ 350ml 1 SET (48 CANS) | 350ml | 1 SET (48 CANS: 24 CANS × 2 BOXES) | ¥5,500  PER CAN ¥114.6  ADD TO CART |

I LIKE TO HAVE 6 CANS

FIG. 19
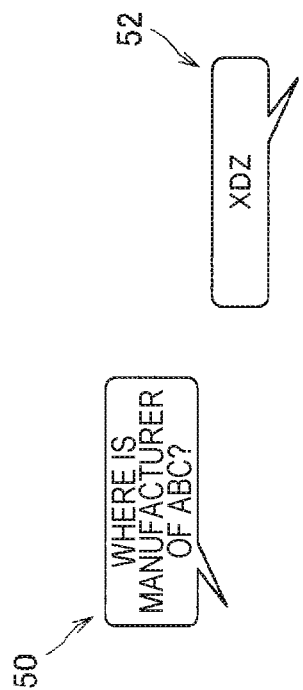
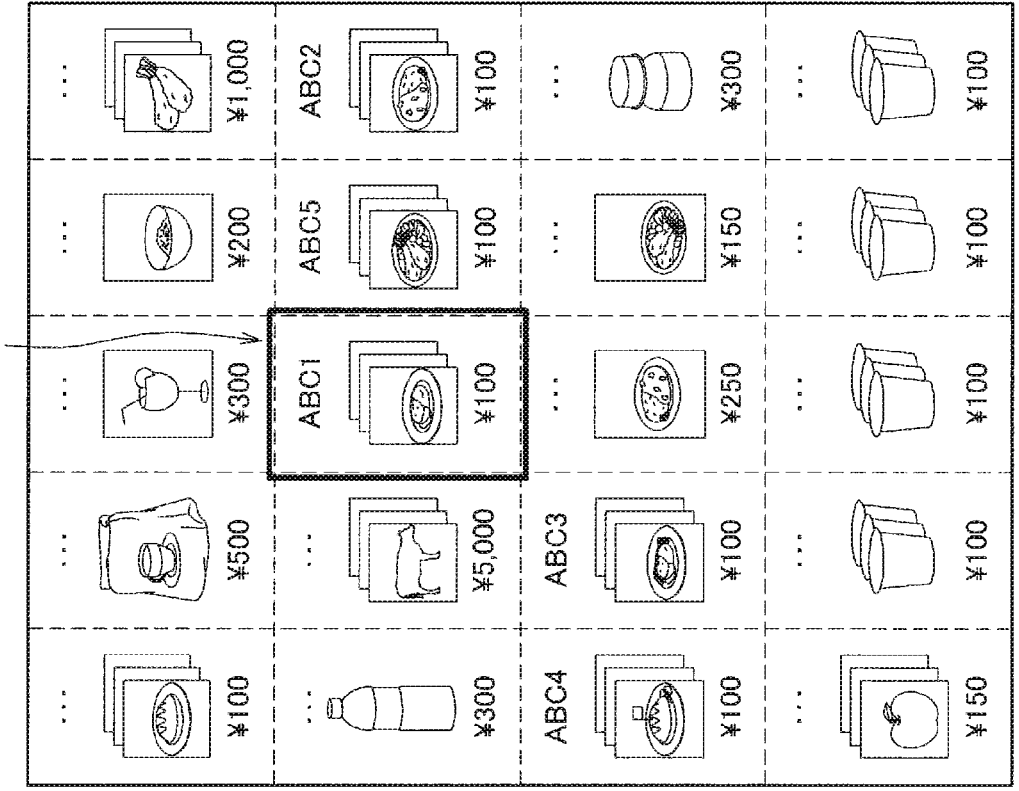

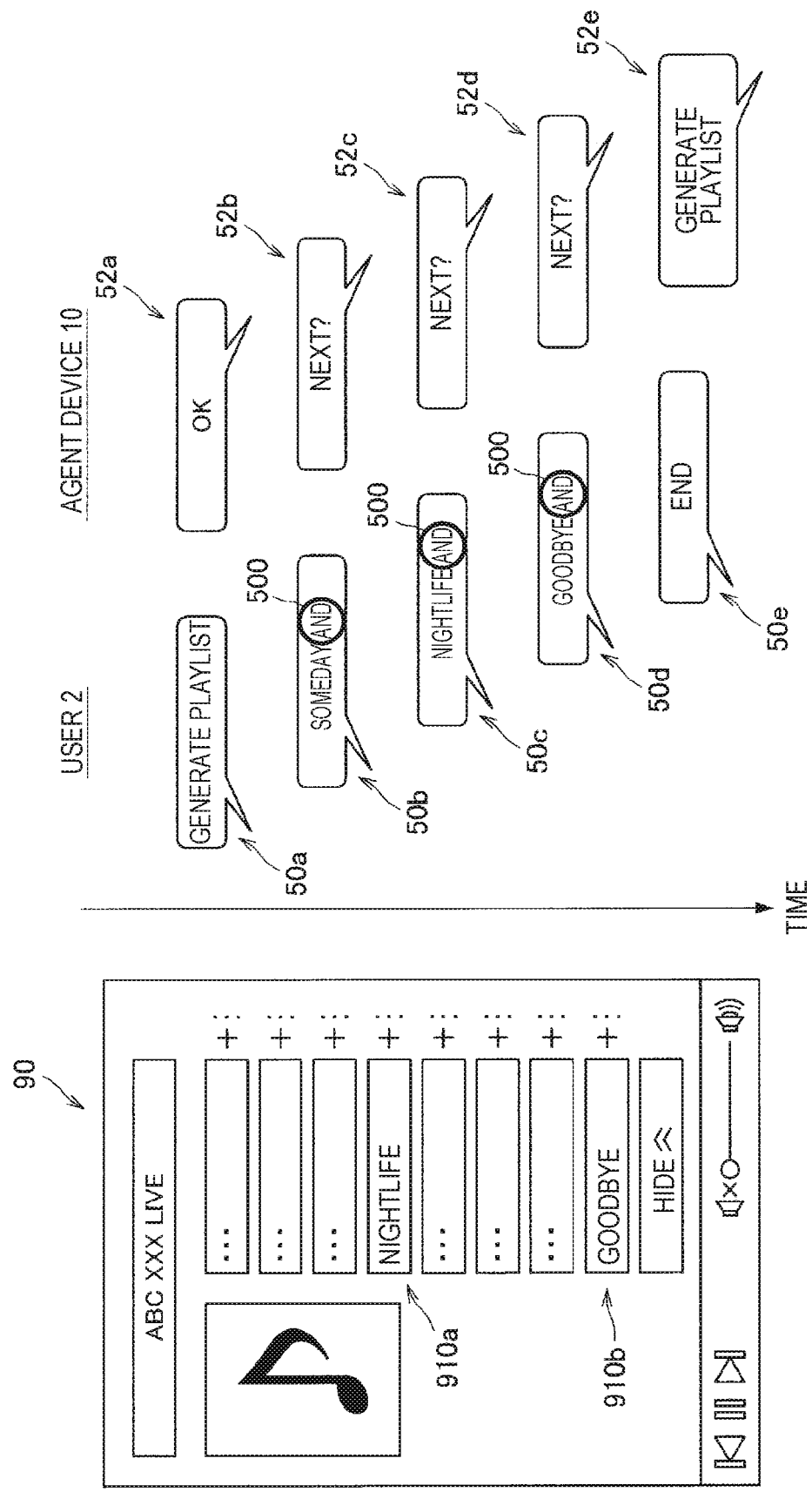

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/017935 filed on May 11, 2017, which claims priority benefit of Japanese Patent Application No. JP 2016-159668 filed in the Japan Patent Office on Aug. 16, 2016. Each of the above-referenced applications is hereby incorporated herein by reference in its entirety.

TECHNICAL FIELD

The present disclosure relates to an information processing device, an information processing method, and a program.

BACKGROUND ART

In the past, various kinds of technologies relating to electronic commerce (EC) such as online shopping have been developed.

For example, Patent Literature 1 discloses a technique that enables a user to input a product name by voice and purchase a product with the product name in online shopping.

CITATION LIST

Patent Literature

Patent Literature 1: JP 2014-229278A

DISCLOSURE OF INVENTION

Technical Problem

However, in the technique disclosed in Patent Literature 1, convenience is low when the voice input is used. For example, in the technique disclosed in Patent Literature 1, a process to be executed is decided depending on only a voice recognition result of an input voice.

In this regard, the present disclosure proposes an information processing device, an information processing method, and a program which are novel and improved and capable of improving convenience in a situation in which a process is executed on the basis of speech.

Solution to Problem

According to the present disclosure, there is provided an information processing device, including: an acquiring unit configured to acquire collected speech; and a process executing unit configured to perform a predetermined process on the basis of the speech and a plurality of display objects in a first display range corresponding to a current display range.

In addition, according to the present disclosure, there is provided an information processing method, including: acquiring collected speech; and performing, by a processor, a predetermined process on the basis of the speech and a plurality of display objects in a first display range corresponding to a current display range.

In addition, according to the present disclosure, there is provided a program causing a computer to function as: an acquiring unit configured to acquire collected speech; and a process executing unit configured to perform a predetermined process on the basis of the speech and a plurality of display objects in a first display range corresponding to a current display range.

Advantageous Effects of Invention

As described above, according to the present disclosure, it is possible to improve convenience in a situation in which a process is executed on the basis of speech. Further, the effects described here are not necessarily limiting, and any effect described in the present disclosure may be included.

BRIEF DESCRIPTION OF DRAWINGS

FIG. 2 is an explanatory diagram illustrating a configuration example of a process definition DB 30 according to the embodiment.

FIG. 9 is an explanatory diagram illustrating a display example of a plurality of display objects according to the embodiment and an example of speech for selecting a display object.

FIG. 13 is an explanatory diagram illustrating an example in which speech is performed at the same time as a scroll manipulation on a display screen 40.

FIG. 19 is an explanatory diagram illustrating an output example of information of a response to speech according to an application example of the embodiment.

FIG. 25 is an explanatory diagram illustrating a generation example of a playlist on the basis of speech according to the modified example.

MODE(S) FOR CARRYING OUT THE INVENTION

Figure 1:
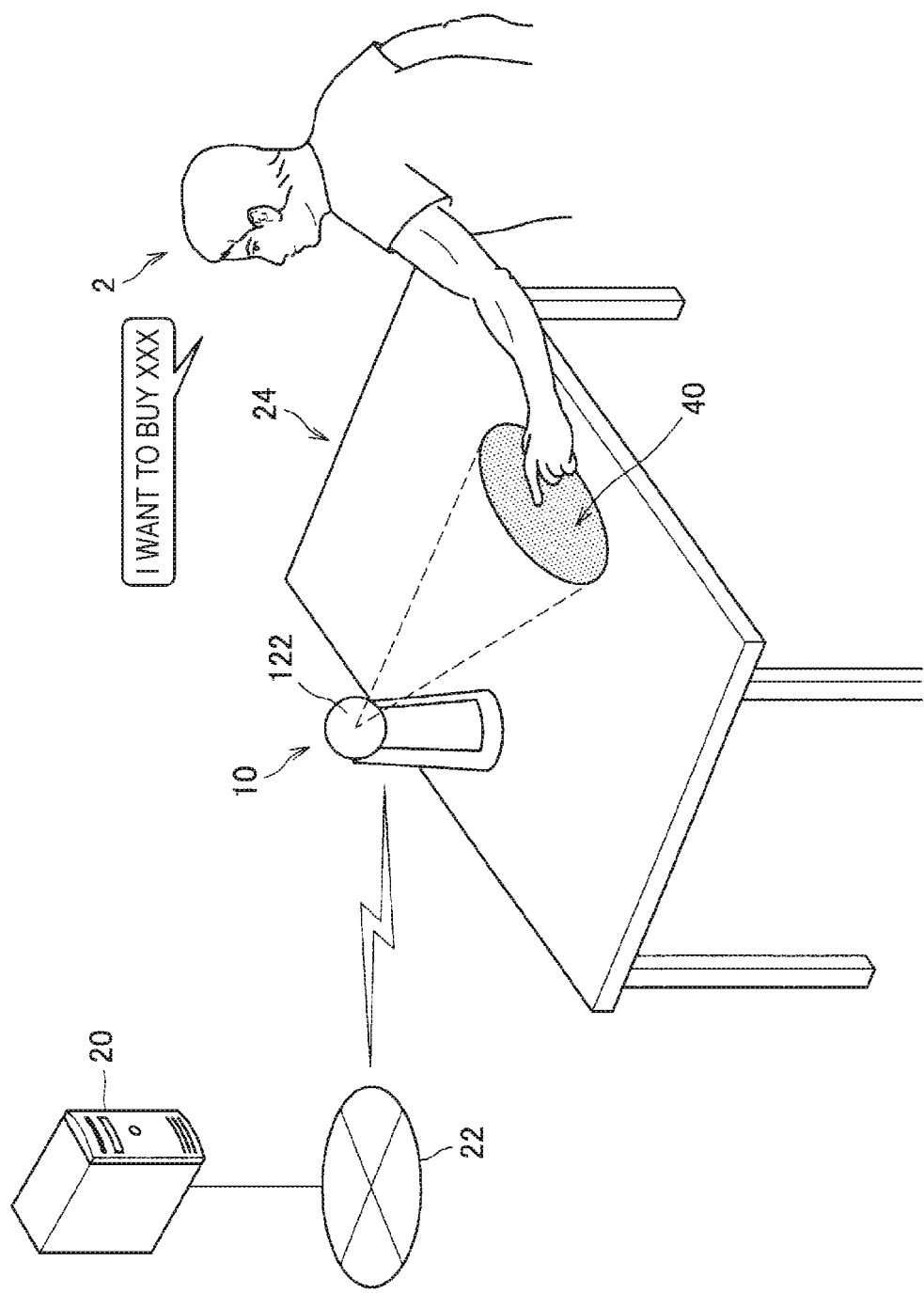
FIG. 1 is an explanatory diagram illustrating a configuration example of an information processing system according to the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, a plurality of constituent elements having substantially the same functional configuration are distinguished by attaching different letters after the same reference numerals. For example, a plurality of configurations having substantially the same functional configuration are distinguished like an agent device 10a and an agent device 10b if necessary. Here, in a case in which it is not necessary to particularly distinguish each of a plurality of constituent elements having substantially the same functional configuration, only the same reference numerals are attached. For example, in a case in which it is not necessary to particularly distinguish an agent device 10a and an agent device 10b, they are referred to simply as an agent device 10.

Further, a "mode for carrying out the invention" will be described in accordance with the order of items described below.
1. Configuration of information processing system
2. Detailed description of embodiment
3. Hardware configuration
4. Modified example 1. Configuration of Information Processing System First, a configuration of an information processing system according to the present disclosure will be described with reference to FIG. 1. As illustrated in FIG. 1, the information processing system includes an agent device 10, a server 20, and a communication network 22.
<1-1. Server 20>
The server 20 is, for example, a device for managing an EC service. The server 20 manages information of a plurality of products requested to be posted on a web page or the like from, for example, a plurality of business operators. Further, each of the plurality of products may be associated with one or more display objects.

Here, the display object may include one or more character strings, images, GUI objects, and/or the like to be displayed. Further, the display object may further include information (metadata (for example, detailed information of a product or the like) or link information) associated with the display object. Further, the following description will proceed focusing on an example in which the display object is displayed on a display screen (such as a web page) related to, for example, the EC service. For example, the display object may include a character string such as a name, a price, or the like of a product corresponding to the display object, an image of the product, a purchase button of the product, and the like.
<1-2. Agent Device 10>
{1-2-1. Overview}
The agent device 10 is an example of an information processing device in the present disclosure. The agent device 10 can be placed on a desk, a wall, a ceiling, or the like in a predetermined building (for example, a user's home). However, the present disclosure is not limited to such an example, and the agent device 10 may be a portable device.

The agent device 10 is capable of collecting sounds such as speech of the user and performing voice recognition on the collected sounds. For example, the agent device 10 can perform the voice recognition on the collected speech and analyze a meaning of a character string obtained from the voice recognition result.

Further, the agent device 10 has a function of displaying images. For example, as illustrated in FIG. 1, the agent device 10 can project an image onto a projection plane 24.

Further, the agent device 10 may include a photographing unit (not illustrated). Further, the agent device 10 can recognize a touch manipulation of the user on the projection plane 24, for example, on the basis of an image obtained by photographing a direction of the projection plane 24.

Further, an application that enables the user to use an EC service (hereinafter referred to as an EC application) can be installed in the agent device 10. Using the EC application, the agent device 10 can receive a list of display objects corresponding to a plurality of products registered in the server 20 from the server 20 via a communication network 22 to be described later and display the list of display objects. Further, the agent device 10 can select and display only some display objects from among a plurality of display objects or change an arrangement order of the display objects, for example, on the basis of natural speech, a touch input, or the like of the user. For example, the agent device 10 transmits a search keyword specified from the speech of the user to the server 20 via the communication network 22, and displays only some display objects among a plurality of display objects on the basis of the search result received from the server 20. Accordingly, the user can narrow down products that she or he desires to purchased (via the EC service) from the products corresponding to a plurality of display objects being displayed.

FIG. 2 is an explanatory diagram illustrating a configuration example of a process definition DB 30 in which a type of speech of the user and a type of process executed by the agent device 10 when voice data of the speech is acquired are defined regarding the EC application. As illustrated in FIG. 2, for example, in the process definition DB 30, a scene, a type of speech, and a type of process executed by the agent device 10 when the voice data of the speech is acquired are associated. In an example illustrated in a first record of FIG. 2, when speech "I want to buy xxx" is collected in a state in which the EC application is not activated, the agent device 10 activates the EC application, receives, for example, the search result based on the keyword "xxx" from among the display objects corresponding to a plurality of products registered in the server 20 from the server 20, and displays the search result.

{1-2-2. Flow of Process Related to EC Application}

Here, an example of a flow of an overall process related to the purchase of a product using the EC application will be described with reference to FIG. 3. Further, a flowchart illustrated in FIG. 3 can be changed depending on registered content of the process definition DB 30.

Figure 3:
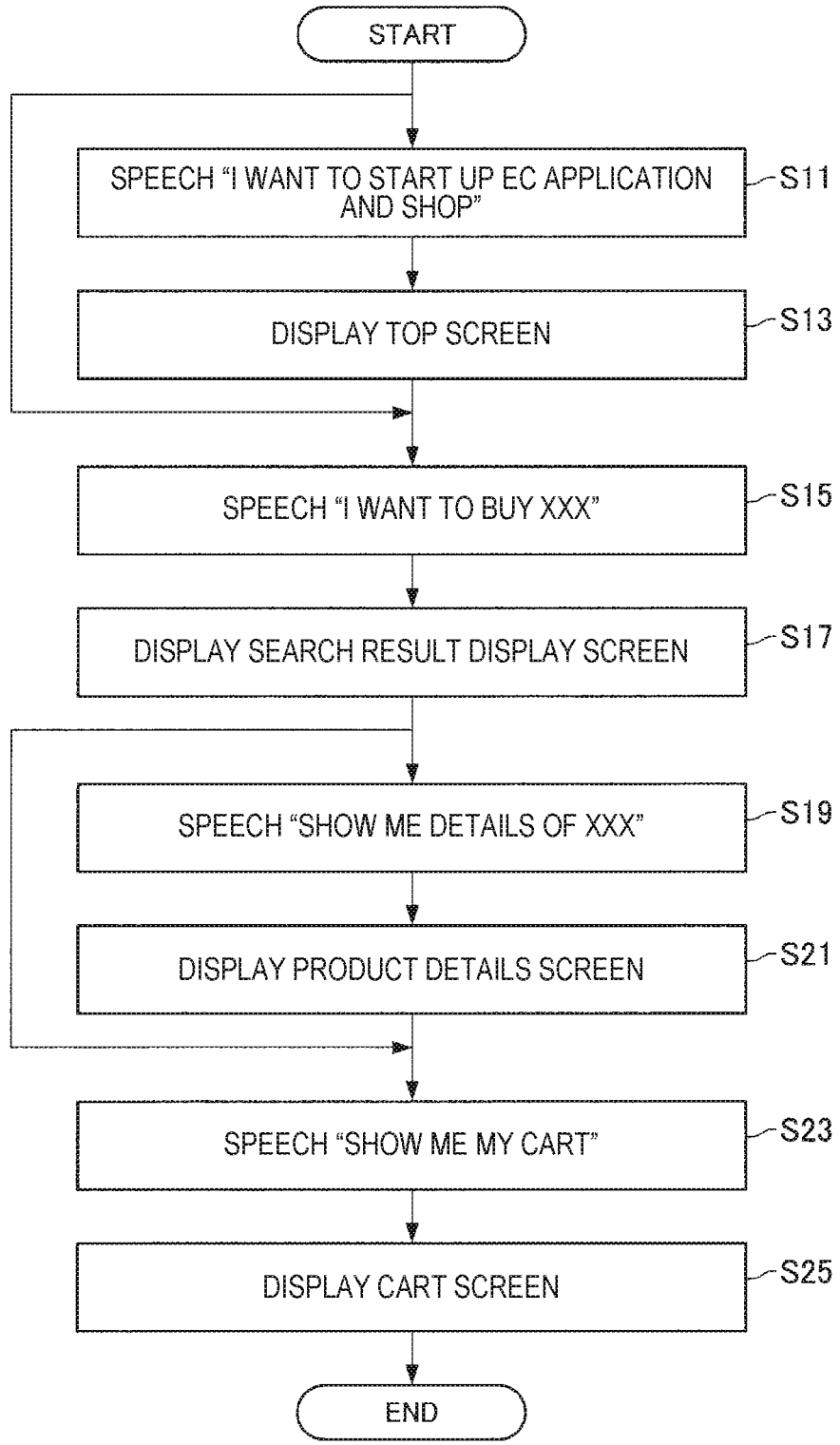
FIG. 3 is a flowchart illustrating an example of a flow of an overall process related to the purchase of a product using an EC application according to the embodiment.

As illustrated in FIG. 3, if the user speaks "I want to start up EC application and do shopping" (S11), the agent device 10 projects a top screen of the EC application onto the projection plane 24 (S13).

Further, initially or after S13, if the user says "I want to buy XXX" (S15), the agent device 10 transmits a search request for a display object corresponding to "XXX" to the server 20, and receives a search result list from the server 20. Then, the agent device 10 projects a search result display screen including the received search result list onto the projection plane 24 (S17). Alternatively, the agent device 10 may receive display control information for the search result display screen from the server 20. Then, the agent device 10 may project the search result display screen onto the projection plane 24 on the basis of the display control information.

Further, if the user says, for example, "I'll buy XXX" when the search result display screen is displayed, the agent device 10 selects the display object corresponding to "XXX" among a plurality of display objects being displayed, and temporarily stores identification information of the selected display object (or the product corresponding to the display object) in a storage unit 130 to be described later.

After S17, if the user says "show me details of XXX" (S19), the agent device 10 projects a product details screen for the product indicated by the display object corresponding to "XXX" onto the projection plane 24 (S21). Further, if the user says, for example, "I'll buy this" when the product details screen is displayed, the agent device 10 temporarily stores the identification information of the corresponding product in the storage unit 130.

Further, after S17 or after S21, if the user says "show me my cart" (S23), the agent device 10 projects a cart screen illustrating a list of products currently stored in the cart onto the projection plane 24 (S25).

{1-2-3. Search Result Display Screen}

Figure 4:
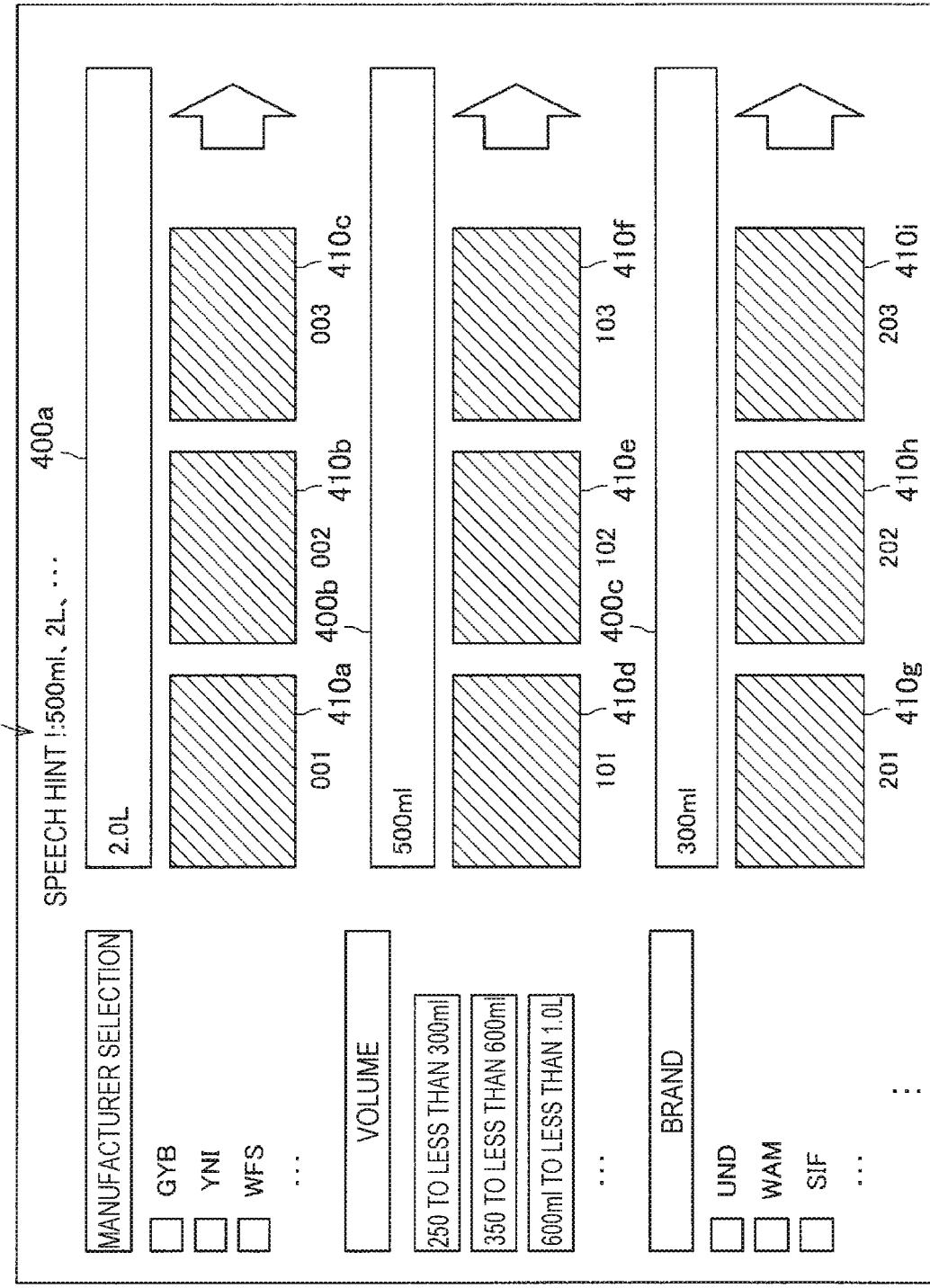
FIG. 4 is a diagram illustrating a display example of a search result display screen according to the embodiment.

Next, a display example of the search result display screen (a search result display screen 40a) will be described with reference to FIG. 4. As illustrated in FIG. 4, display objects 410 corresponding to a plurality of products are displayed in the search result display screen 40a. Here, a plurality of display objects 410 may be classified and displayed for each category field 400 as illustrated in FIG. 4. Further, as illustrated in FIG. 4, a speech hint 420 may be further displayed in the search result display screen 40a. Here, the speech hint 420 includes a search keyword candidate for the user to narrow down products of the purchase target. Further, keyword candidates learned on the basis of a previous search history or the like may be displayed in individual category fields 400 and/or the speech hint 420. For example, different types of keyword candidates may be displayed in individual category fields 400 and/or the speech hint 420 in descending order of probabilities of types to be used as the keyword for narrowing down (searching) by the user for each narrowing-down. In the example illustrated in FIG. 4, different types of keyword candidates may be displayed (each time the user gives an instruction to narrow down in accordance with the order) in descending order of probabilities of types to be used as the keyword for narrowing down by the user such that a first keyword is "volume," a second keyword is "brand," a third keyword is "number of pieces," and the like. According to this display example, it is possible to efficiently narrow down the products that the user desires to purchase.

<1-3. Communication Network 22>

The communication network 22 is a wired or wireless transmission path of information transmitted from devices connected to the communication network 22. For example, the communication network 22 may include a public line network such as a telephone network, the Internet, and a satellite communication network, various kinds of local area networks (LANs) including Ethernet (registered trademark), and a wide area network (WAN). Further, the communication network 22 may include a dedicated line network such as an Internet protocol-virtual private network (IP-VPN).

<1-4. Description of Problems>

The configuration of the information processing system according to the present embodiment has been described above. If it is possible to directly designate a specific display object (for example, a display object 410e) among a plurality of display objects included in the search result list screen, for example, while the search result list screen illustrated in FIG. 4 is being displayed, by natural speech, the convenience is high, and it is desirable. In particular, if it is possible to designate a specific display object by natural speech in a situation in which it is very difficult for the user to touch the search result list screen, for example, since a distance between the projection plane on which the search result list screen is displayed (or a display on which the search result list screen is displayed) and the user is large, it is further desirable.

In this regard, an agent device 10 according to the present embodiment was invented in light of the above circumstances. The agent device 10 according to the present embodiment can acquire collected speech and then select the display object from among a plurality of display objects on the basis of the speech and a plurality of display objects in a display range of a selection target corresponding to a current display range. Therefore, the user can easily select a desired display object, for example, from among a plurality of display objects that are currently being viewed. Here, the display range of the selection target is an example of a first display range in the present disclosure. Further, specific content of the display range of the selection target will be described later.

2. Detailed Description of Embodiment 2-1. Configuration

Figure 5:
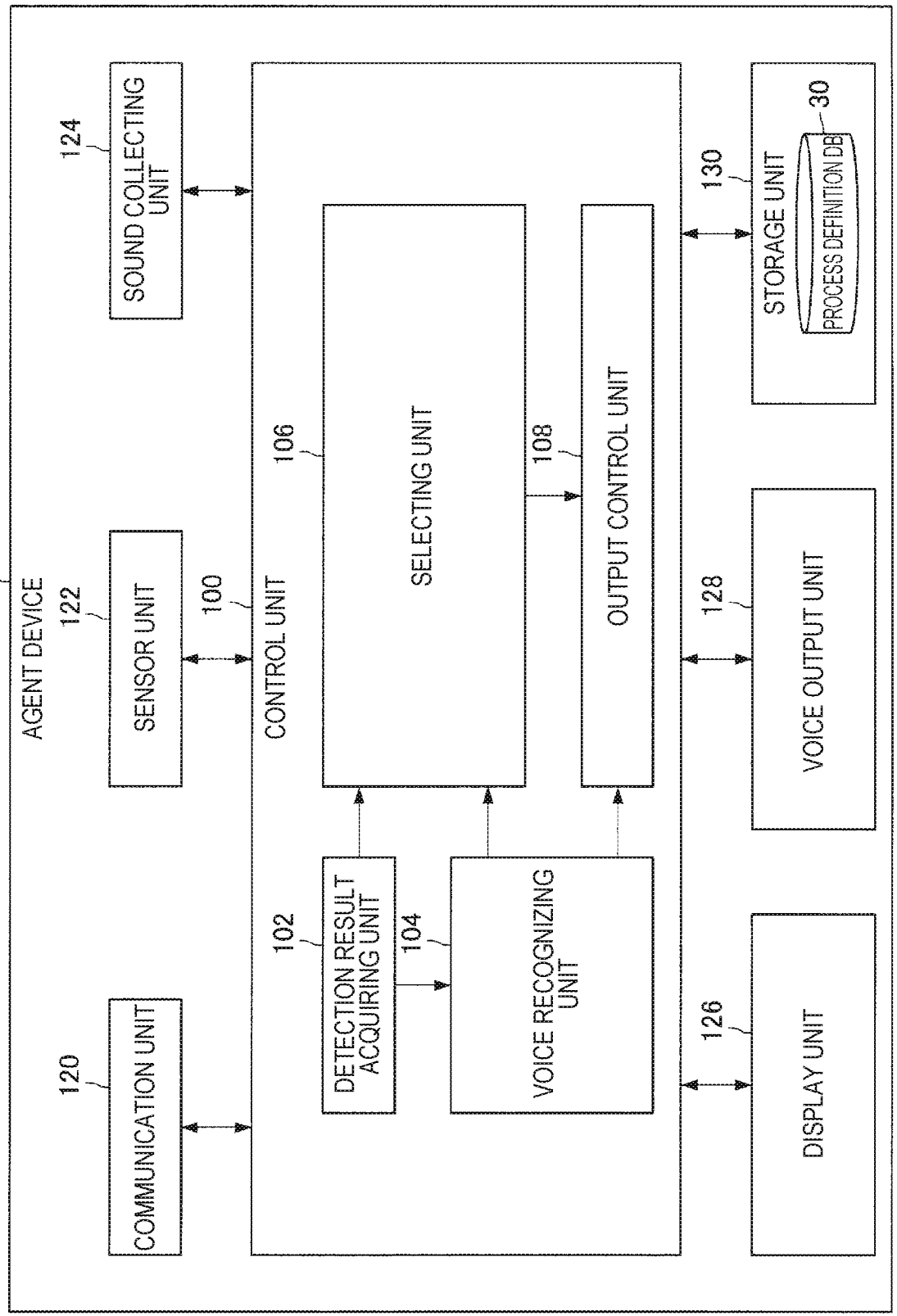
FIG. 5 is a functional block diagram illustrating a configuration example of an agent device 10 according to the embodiment.

Next, a configuration of the present embodiment will be described in detail. FIG. 5 is a functional block diagram illustrating a configuration example of the agent device 10 according to the present embodiment. As illustrated in FIG. 5, the agent device 10 includes a control unit 100, a communication unit 120, a sensor unit 122, a sound collecting unit 124, a display unit 126, a voice output unit 128, and a storage unit 130.

{2-1-1. Control Unit 100}

The control unit 100 controls an operation of the agent device 10 in general using hardware such as a central processing unit (CPU) 150 (to be described later) or a random access memory (RAM) 154 (to be described later) which is installed in the agent device 10. Further, as illustrated in FIG. 5, the control unit 100 includes a detection result acquiring unit 102, a voice recognizing unit 104, a selecting unit 106, and an output control unit 108.

{2-1-2. Detection Result Acquiring Unit 102}

The detection result acquiring unit 102 is an example of an acquiring unit in the present disclosure. The detection result acquiring unit 102 acquires various kinds of information detected by the sensor unit 122 (to be described later) and sound information collected by the sound collecting unit 124.

{2-1-3. Voice Recognizing Unit 104}

The voice recognizing unit 104 is an example of a process executing unit in the present disclosure. The voice recognizing unit 104 performs voice recognition on speech acquired by the detection result acquiring unit 102 on the basis of, for example, a plurality of display objects currently displayed by the display unit 126. For example, first, the voice recognizing unit 104 performs the voice recognition on the collected speech and specifies a plurality of candidates for the voice recognition result. Then, the voice recognizing unit 104 calculates a degree of matching of each of a plurality of specified voice recognition result candidates on the basis of the plurality of display objects currently being displayed. Then, the voice recognizing unit 104 decides a candidate having the highest degree of matching as the voice recognition result of the speech.

Figure 6:
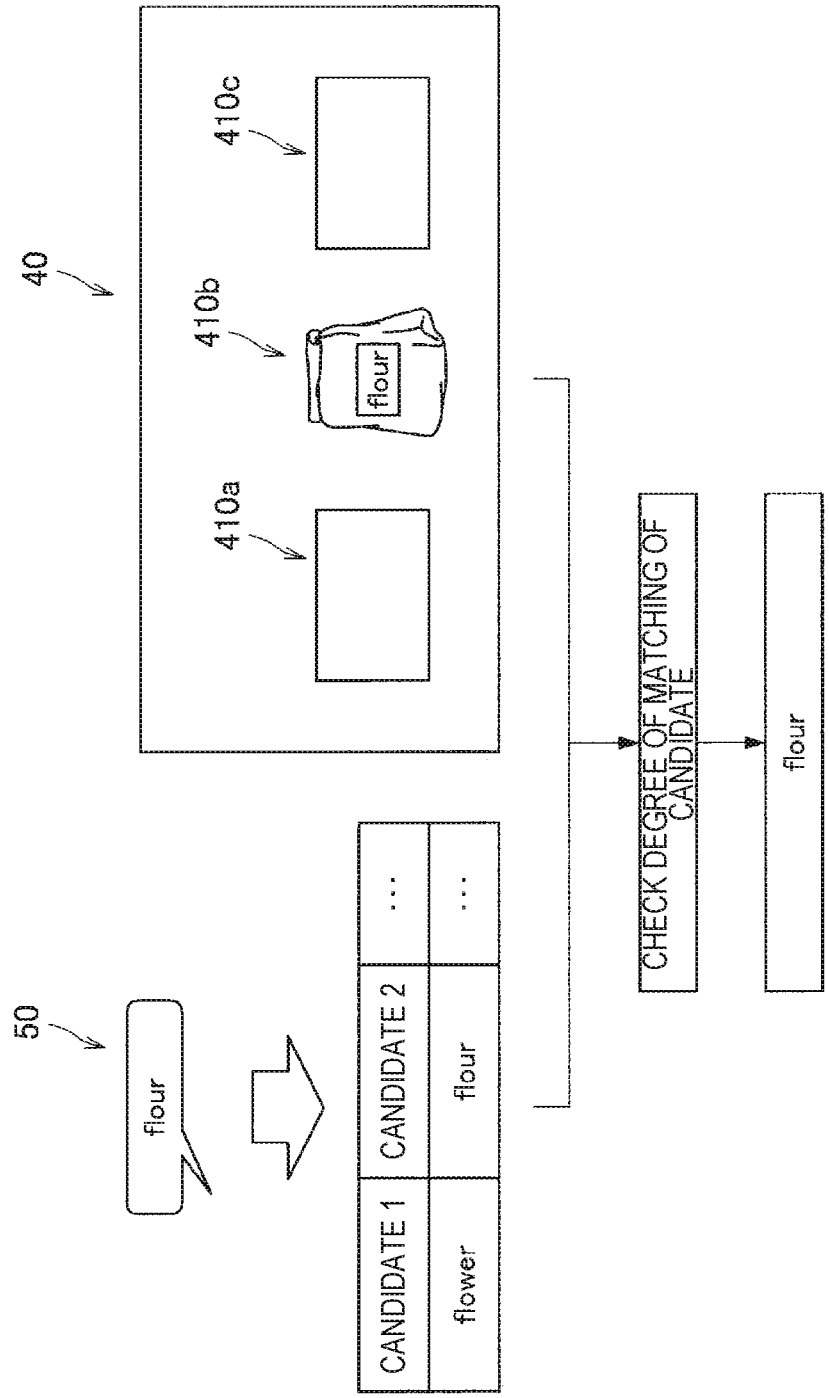
FIG. 6 is an explanatory diagram illustrating an example of voice recognition according to the embodiment.

FIG. 6 is an explanatory diagram illustrating an example of voice recognition by the voice recognizing unit 104. The example illustrated in FIG. 6 is based on the premise that the user performs speech 50 of "flour" when a search result display screen 40 including a plurality of display objects 410 is displayed.

In this case, for example, the voice recognizing unit 104 first identifies a plurality of voice recognition result candidates such as "flower" and "flour" on the basis of a phoneme string of the collected speech. Then, the voice recognizing unit 104 calculates a degree of matching of each of a plurality of specified voice recognition result candidates on the basis of a plurality of display objects 410 currently being displayed. In the example illustrated in FIG. 6, a display object 410b includes a character string "flour," and character strings corresponding to other voice recognition result candidates are not displayed in a search result screen 40. In this regard, the voice recognizing unit 104 calculates a degree of matching of "flour" among a plurality of specified voice recognition result candidates as the highest value. Then, the voice recognizing unit 104 decides "flour" as the voice recognition result of the speech 50.

{2-1-4. Output Control Unit 108}

(2-1-4-1. Display Control)

The output control unit 108 is an example of a process executing unit in the present disclosure. The output control unit 108 controls display on the display unit 126. For example, in a case in which speech including an instruction related to a display method is collected, the output control unit 108 updates the display by the display unit 126 so that a plurality of display objects are displayed on the display unit 126 in accordance with a display method corresponding to the voice recognition result of the speech. For example, in a case in which speech for giving an instruction to rearrange the display objects is collected, the output control unit 108 rearranges a plurality of display objects in an order according to the speech and displays the display objects on the display unit 126. In the example illustrated in FIG. 4, in a case in which speech "arrange in order from low price" is collected, the output control unit 108 rearranges a plurality of display objects 410 in ascending order of prices of the products corresponding to the plurality of display objects 410 and causes the display objects 410 to be displayed on the display unit 126.

Figure 7:
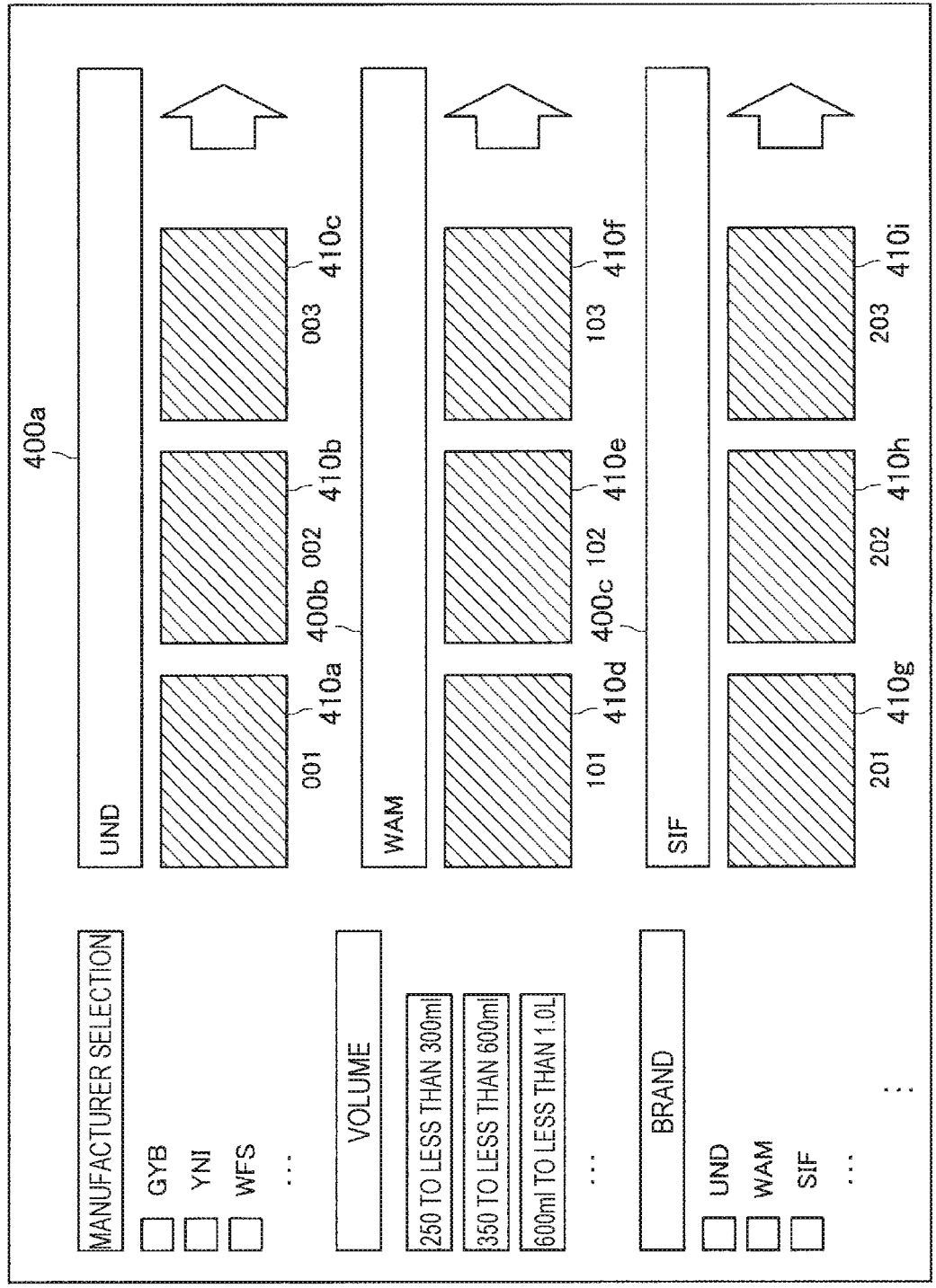
FIG. 7 is a diagram illustrating another display example of a search result display screen according to the embodiment.

Further, in a case in which speech for giving an instruction to change a classification is collected, the output control unit 108 updates the display by the display unit 126 so that a plurality of display objects are re-displayed in accordance with a classification corresponding to the speech. In the example illustrated in FIG. 4, in a case in which speech "display by brand" is collected, for example, the output control unit 108 re-classifies a plurality of displays in accordance with "brands" of the products corresponding to a plurality of display objects 410 as in the search result display screen 40b illustrated in FIG. 7 and causes the display objects 410 to be displayed on the display unit 126.

Further, the output control unit 108 controls display on the display unit 126 on the basis of a result of selection by the selecting unit 106 to be described later. For example, in a case in which one or more display objects are selected from among a plurality of display objects by the selecting unit 106, the output control unit 108 updates the display by the display unit 126 so that only the selected display objects are displayed.

(2-1-4-2. Output Control of Sound)

Further, the output control unit 108 controls a sound output to the voice output unit 128. For example, in a case in which speech is collected, the output control unit 108 generates a voice of a response to the speech on the basis of, for example, an analysis result of a meaning of the speech by the voice recognizing unit 104 or the like, and causes the generated voice to be output to the voice output unit 128.

Further, the output control unit 108 controls the sound output to the voice output unit 128 on the basis of the selection result by the selecting unit 106. For example, in a case in which a plurality of display objects are selected by the selecting unit 106, the output control unit 108 can cause information of an inquiry about selection of one of a plurality of selected display objects to be output the voice output unit 128 (or the display unit 126).

Figure 8:
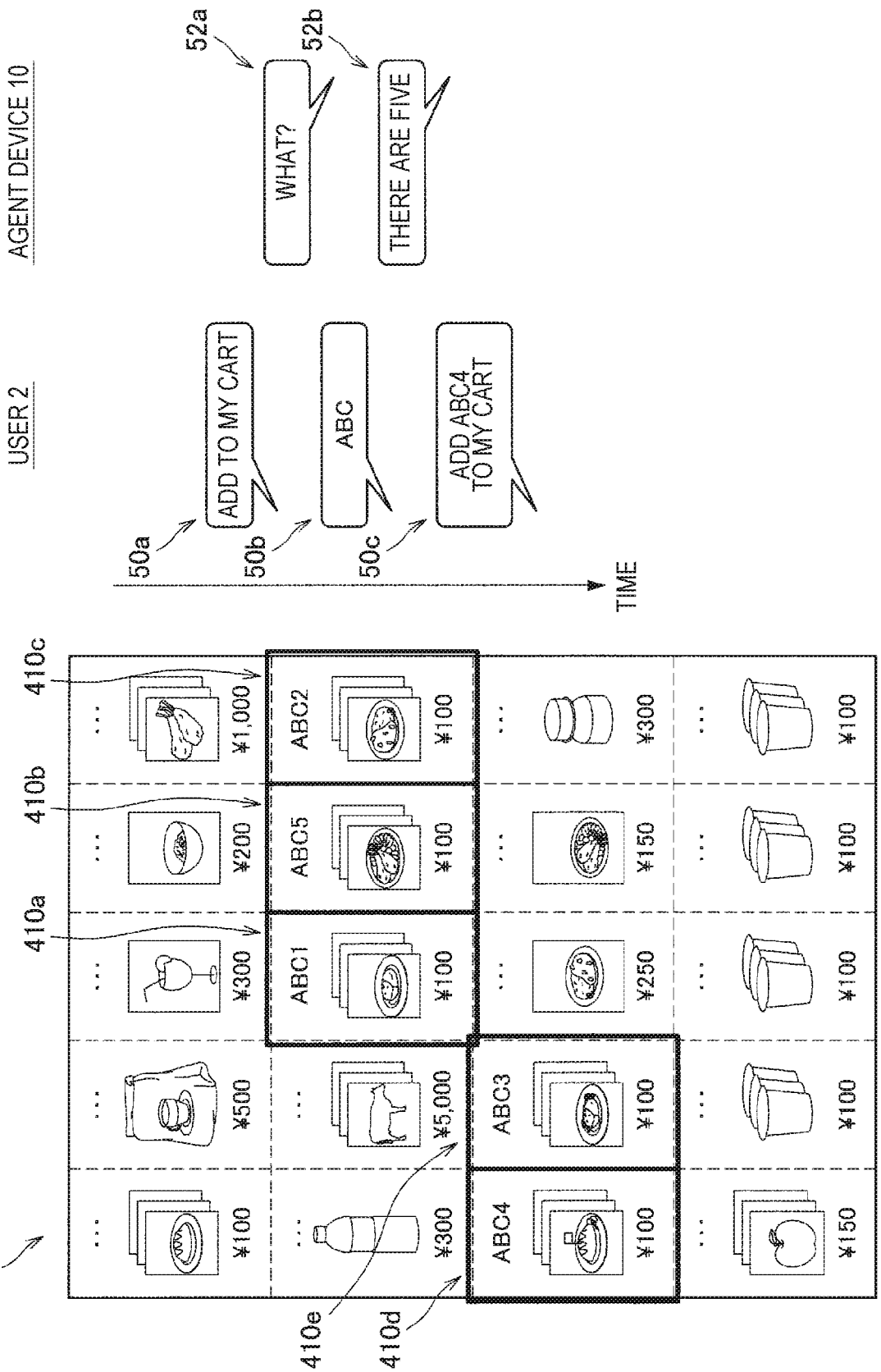
FIG. 8 is an explanatory diagram illustrating an output example of inquiry information in a case in which a plurality of display objects according to the embodiment are selected.

Here, the above functions will be described in further detail with reference to FIG. 8. It is assumed that the user first performs speech 50a "add to my cart," and then performs speech 50b "ABC" in a situation in which five display objects 410 including the character string "ABC" are displayed on the display screen 40 as illustrated in FIG. 8. Then, it is assumed that the selecting unit 106 selects the five display objects 410 (the display objects 410a to 410e) on the basis of the collected speech 50b.

In this case, the output control unit 108 causes a voice 52b of an inquiry for causing the user to select one or more display objects among the five display objects 410 such as the voice 52b "there are five" to be output to the voice output unit 128 as illustrated in FIG. 8. Further, thereafter, if the user performs, for example, speech 50c "add ABC4 to my cart," a display object 410d (from the five display objects 410) can be selected by the selecting unit 106. Further, the output control unit 108 can perform control such that the current display range is not changed even if the user performs a scroll manipulation or the like until the speech 50c of the response of the user to the voice 52b of the inquiry is acquired after the voice 52b is output. Accordingly, it is possible to cause the user to sufficiently confirm the five display objects 410 and cause the user to accurately select the desired display object.

{2-1-5. Selecting Unit 106}

2-1-5-1. Basic Selection Example

The selecting unit 106 is an example of a process executing unit in the present disclosure. The selecting unit 106 selects the display object (or a product corresponding to the display object) corresponding to the voice recognition result of the speech by the voice recognizing unit 104 from a plurality of display objects in the display range of the selection target. Here, the display range of the selection target may include the current display range.

For example, the selecting unit 106 selects the display object corresponding to the voice recognition result from a plurality of display objects on the basis of a comparison between information related to each of a plurality of display objects and the voice recognition result. As an example, the selecting unit 106 selects, from among a plurality of display objects, only a display object which matches a comparison result between the information related to each of a plurality of display objects and a keyword included in the voice recognition result.

For example, the selecting unit 106 first specifies a search word for extracting only the display object corresponding to the voice recognition result from a plurality of display objects. Then, the selecting unit 106 causes the communication unit 120 to transmit a search request including the specified search word to the server 20, and acquires the display object corresponding to the voice recognition result from the server 20.

Here, the information related to the display object may include metadata associated with the corresponding display object, a result of image analysis of the corresponding display object (a color, a shape, a type of label, or the like), and/or information of a display position of the corresponding display object in the current display range. Further, the metadata may include an identification number associated with the corresponding display object, a name of the product corresponding to the corresponding display object, the number of products, a manufacturer name of the product, a brand name of the product, and the like.

Specific Example 1

For example, when the speech is collected, the selecting unit 106 compares the number included in the voice recognition result of the speech with the identification number associated with each of a plurality of display objects, and selects the display object corresponding to the voice recognition result from among a plurality of display objects. Further, for example, in a case in which speech related to a feature such as "200 ml of brand A" is collected, the selecting unit 106 compares the voice recognition result of the speech with information of the metadata associated with each of a plurality of display objects, and selects the display object corresponding to the voice recognition result from among a plurality of display objects.

Figure 10:
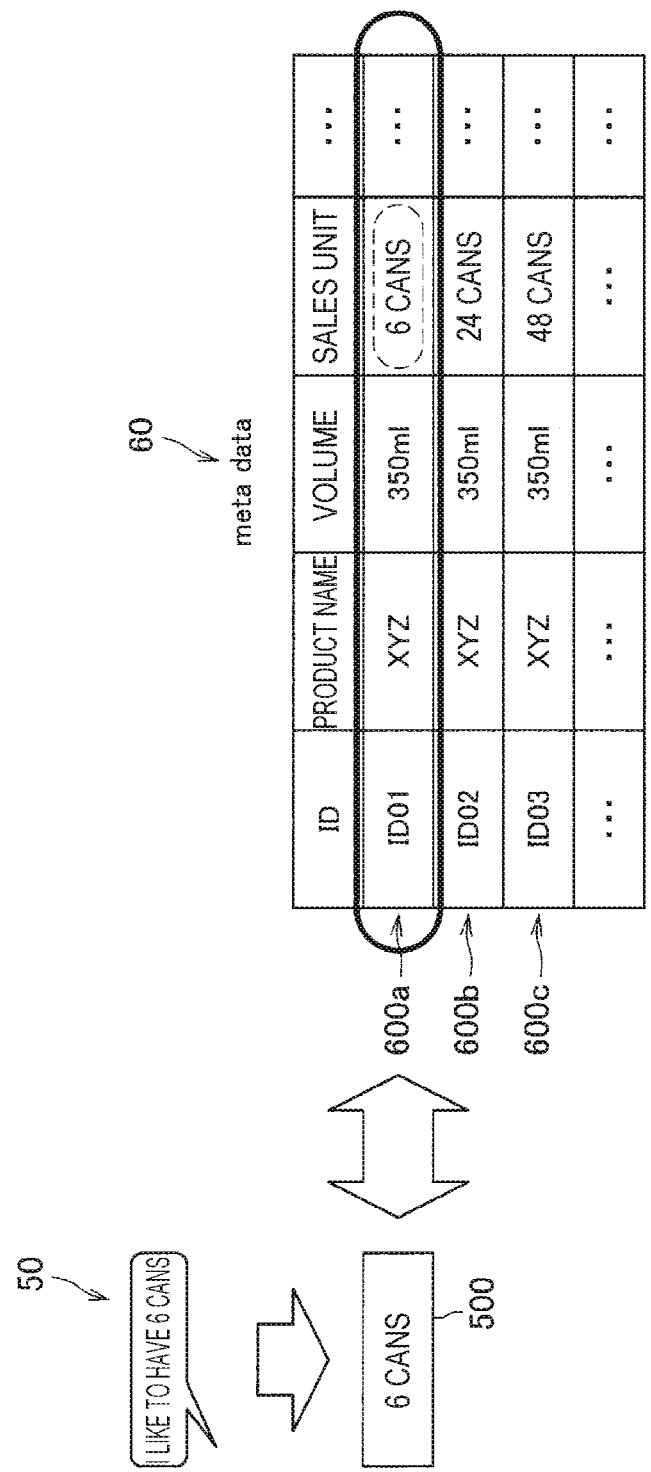
FIG. 10 is an explanatory diagram illustrating a selection example of a display object from among a plurality of display objects according to the embodiment.

The above selection example will be described in further detail with reference to FIGS. 9 to 10. For example, it is assumed that the user performs speech 50 of "I like to have 6 cans" in a situation in which the display screen 40 including a plurality of display objects 410 is displayed as illustrated in FIG. 9. In this case, as illustrated in FIG. 10, the selecting unit 106 first extracts the keyword "6 cans" from the voice recognition result of the "speech 50" of "I like to have 6 cans." Then, the selecting unit 106 compares the information in metadata 60 associated with a display object 410 with the keyword "6 cans" for each of a plurality of display objects 410 being displayed in the display screen 40. Then, the selecting unit 106 selects the display object 410 (the display object 410*a* in the example illustrated in FIG. 9) corresponding to the product whose "sales unit" is "6 cans."

Specific Example 2

Further, for example, in a case in which the speech "red one in middle" is collected, the selecting unit 106 selects a display object whose image analysis result is "red" among one or more display objects located at a position corresponding to "middle" in the current display range as the display object corresponding to the voice recognition result.

Figure 11:
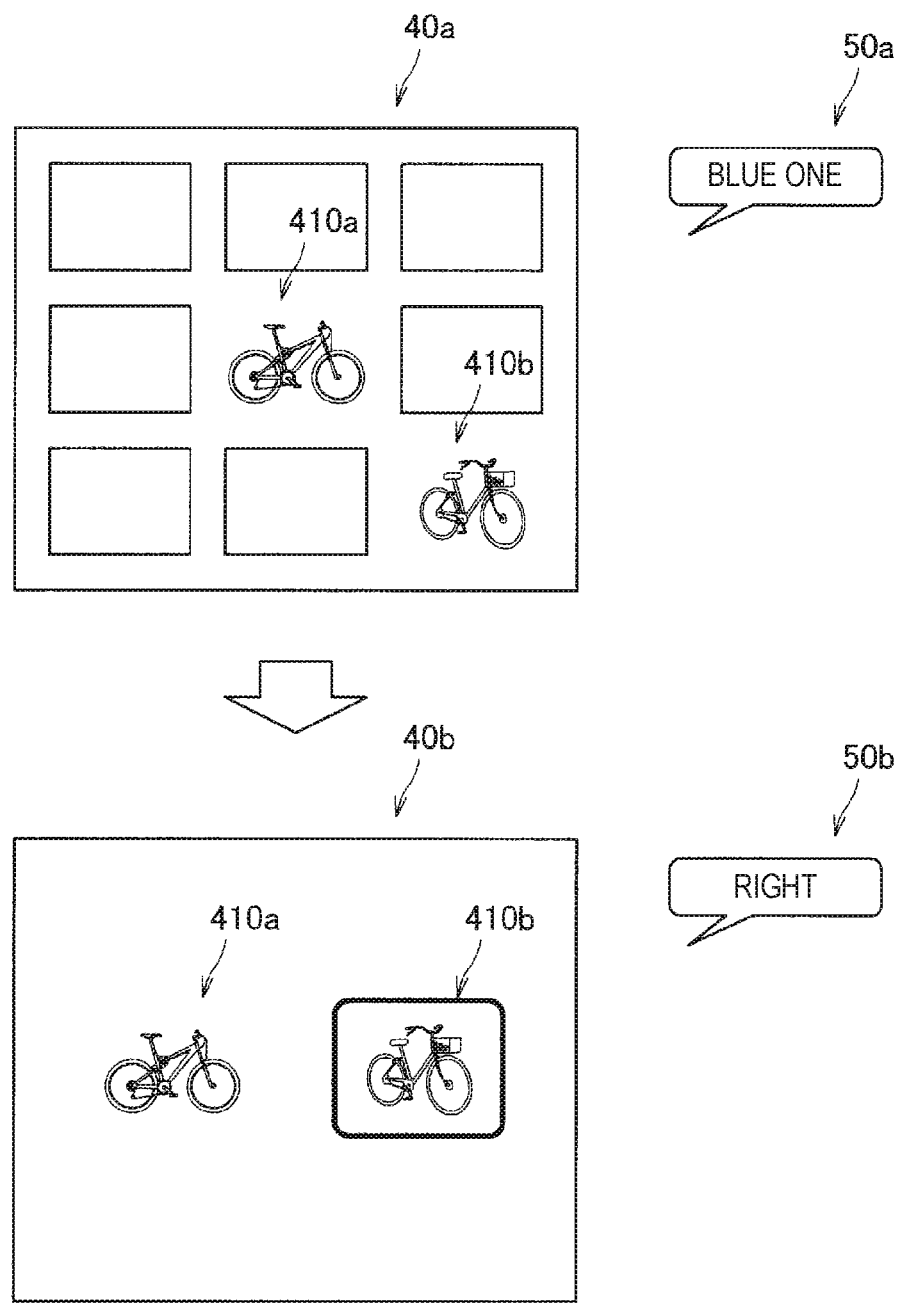
FIG. 11 is an explanatory diagram illustrating another selection example of a display object from among a plurality of display objects according to the embodiment.

Here, the above selection example will be described in further detail with reference to FIG. 11 to FIG. 12. For example, it is assumed that the user performs speech 50*a* "blue one" in a situation in which a display screen 40*a* including nine display objects 410 is displayed as illustrated in FIG. 11. In this case, as illustrated in FIG. 11, the selecting unit 106 first extracts the keyword "blue" from the voice recognition result of the speech 50*a*. Then, the selecting unit 106 selects two display objects 410 whose image analysis result is "blue" among the nine display objects 410 as illustrated in a display screen 40*b*.

Thereafter, it is assumed that the user performs speech 50*b* "right." In this case, as illustrated in FIG. 11, the selecting unit 106 first extracts the keyword "right" from the voice recognition result of the speech 50*b*. Then, the selecting unit 106 further selects the display object 410*b* located on the "right" in the display screen 40*b* out of the two display objects 410 displayed on the display screen 40*b*.

Figure 12:
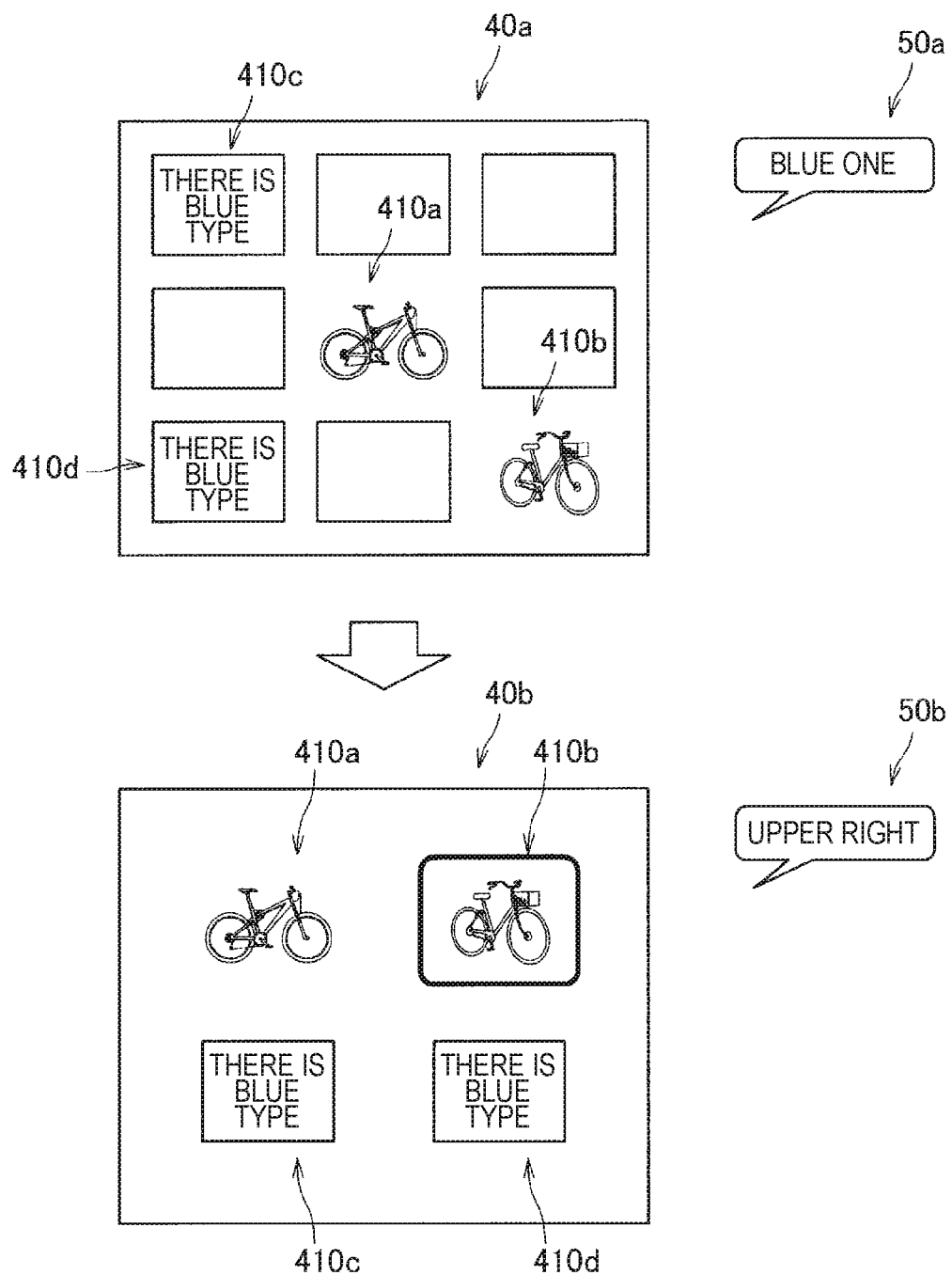
FIG. 12 is an explanatory diagram illustrating another selection example of a display object from among a plurality of display objects according to the embodiment.

Further, FIG. 12 is an explanatory diagram illustrating another selection example. Further, the example illustrated in FIG. 12 is based on the premise that colors of products corresponding to a display object 410*c* and a display object 410*d* are colors other than blue, and there are blue types as a series of products. Further, the other content is similar to that of the example illustrated in FIG. 11.

It is assumed that the user performs speech 50*a* "blue one" in a situation in which the display screen 40*a* is displayed as illustrated in FIG. 12. In this case, the selecting unit 106 first extracts the keyword "blue" from the voice recognition result of the speech 50*a*. Then, as in the display screen 40*b* illustrated in FIG. 12, the selecting unit 106 selects two display objects 410 whose image analysis result is "blue" (that is, the display object 410*a* and the display object 410*b*) among the nine display objects 410, and selects two display objects 410 having a blue type of product (that, the display object 410*c* and the display object 410*d*).

Thereafter, it is assumed that the user performs speech 50*b* "upper right." In this case, as illustrated in FIG. 12, the selecting unit 106 first extracts the keyword "upper right" from the voice recognition result of the speech 50*b*. Then, the selecting unit 106 further selects the display object 410*b* located on the "upper right" in the display screen 40*b* among the four display objects 410 displayed on the display screen 40*b*.

Specific Example 3

Further, the selecting unit 106 can further select the display object corresponding to the voice recognition result from among a plurality of display objects on the basis of attribute information (for example, an age, a sex, a height, a weight, an address, or the like) of the user (speaker). Further, the selecting unit 106 can further select the display object corresponding to the voice recognition result from among a plurality of display objects on the basis of designation of a genre or a usage (such as a product for gift or the like) specified from the voice recognition result of the speech. Further, the selecting unit 106 can further select the display object corresponding to the voice recognition result from among a plurality of display objects on the basis of a detection result of a viewing position or a viewing direction of the user relative to the current display range being displayed by the display unit 126.

2-1-5-2. Selection Example while Scrolling

Further, the selecting unit 106 can select one or more display objects from a plurality of display objects in the display range of the selection target on the basis of the voice recognition result of the speech collected during the touch manipulation such as the scroll manipulation. For example, it is assumed that the user performs speech 50 "I like to have 6 cans" while performing a scroll manipulation 6 on the display screen 40 as illustrated in FIG. 13. In this case, the selecting unit 106 selects the display object 410 (for example, the display object 410a) corresponding to the speech 50 from a plurality of display objects in the display range of the selection target.

—Display Range of Selection Target

Figure 14:
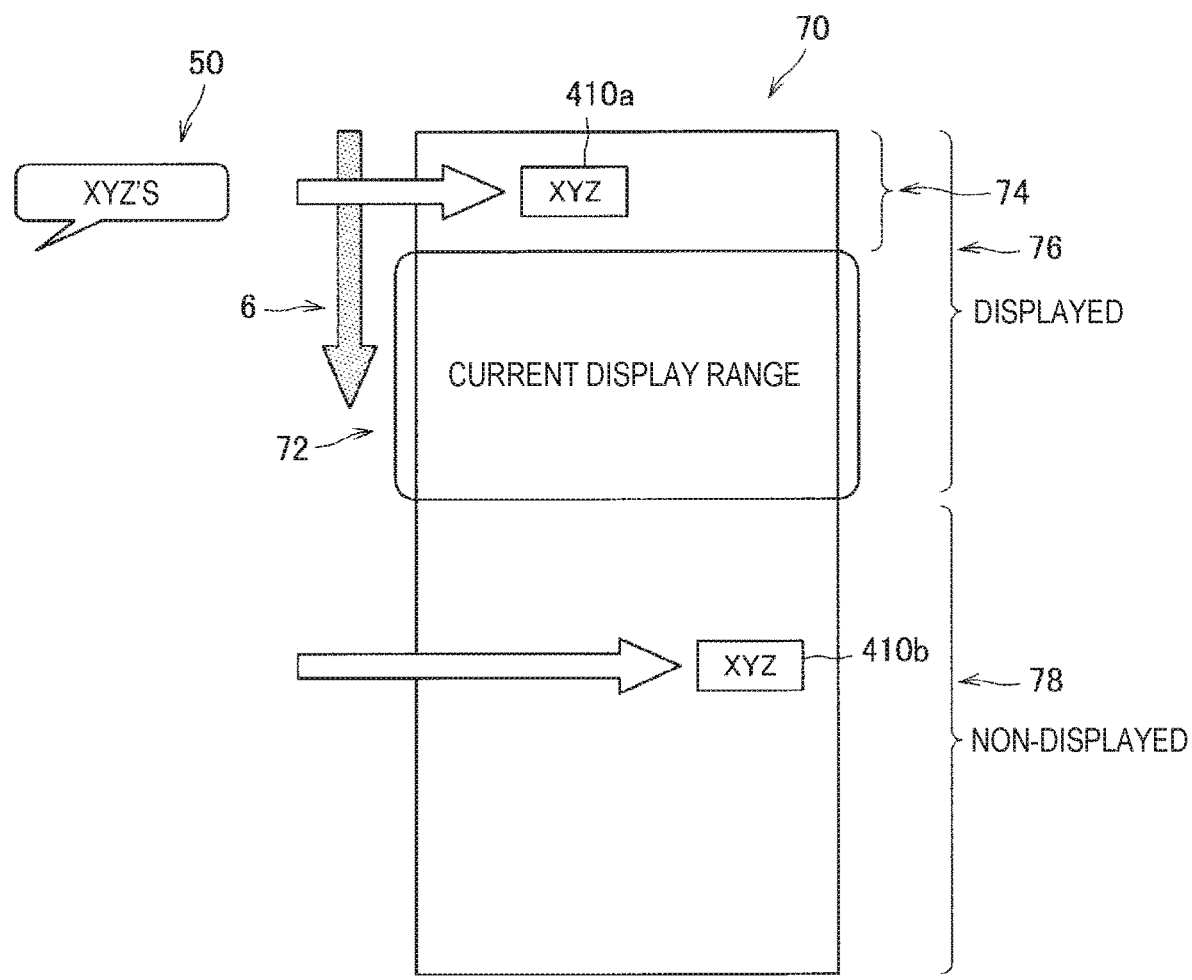
FIG. 14 is an explanatory diagram illustrating an example of a display range of a selection target according to the embodiment.
Figure 15:
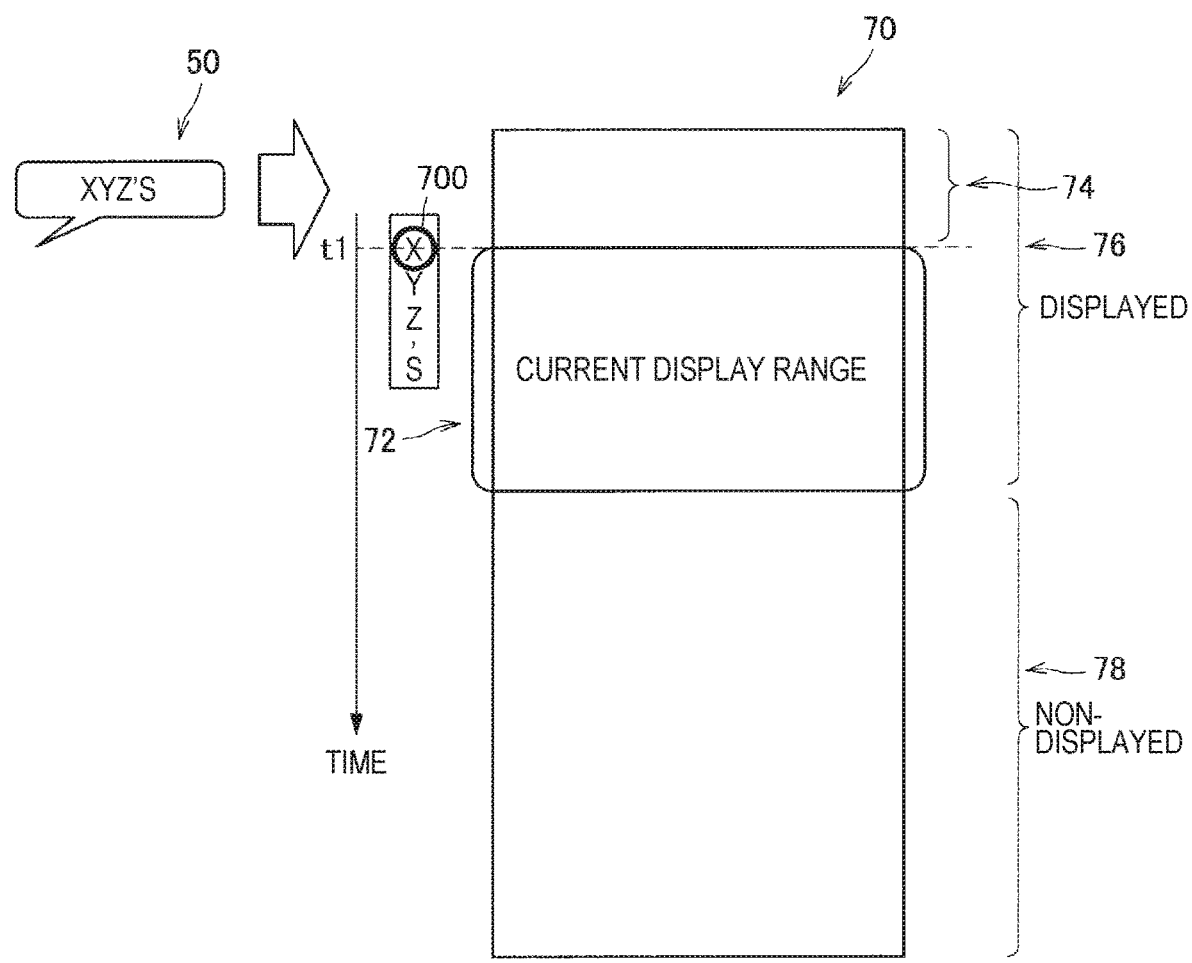
FIG. 15 is an explanatory diagram illustrating an example of a "current display range" according to the embodiment.

Here, an example of the display range of the selection target (a display range 70 of a selection target) will be described in detail with reference to FIGS. 14 and 15. As illustrated in FIG. 14, a display range 70 of the selection target includes a current display range 72, a displayed range 74 (other than the current display range), and a non-displayed display range 78. Further, the display range 70 of the selection target may be a display range along a scroll direction 6 as illustrated in FIG. 14. Here, the displayed range 74 is an example of a second display range in the present disclosure. The displayed display range 74 may be a display range consecutively displayed by the display unit 126 before a display timing of the current display range 72. Further, the non-displayed display range 78 is an example of a third display range in the present disclosure. The non-displayed display range 78 may be a display range that is estimated not to be displayed before the display timing of the current display range 72 but to be consecutively displayed by the display unit 126 after the display timing.

For example, it is assumed that the user performs speech 50 of "XYZ's" as illustrated in FIG. 14. Further, it is assumed that a display object 410 corresponding to the character string "XYZ" is included in each of one displayed display range 74 and one non-displayed display range 78. In this case, the selecting unit 106 can select both the display object 410a in the displayed display range 74 and the display object 410b in the non-displayed display range 78.

Further, the current display range 72 can be decided in accordance with the detection timing of the start of the speech. For example, as illustrated in FIG. 15, in a case in which the user performs the speech 50 "XYZ's" while scrolling from top to bottom, the current display range 72 can be decided so that the top line of the current display range 72 coincides with the top line at a detection timing of a first phoneme of the speech 50 (a time t1 in the example illustrated in FIG. 15).

Further, a priority of the selection by the selecting unit 106 may be decided to differ in accordance with each type of display range. For example, the priority of the selection by the selecting unit 106 may be decided so that the current display range 72, the displayed display range 74 (other than the current display range), and the non-displayed display range 78 are in the descending order of the priorities. For example, in the example illustrated in FIG. 14, the selecting unit 106 selects the display object 410a in the displayed display range 74 with a higher priority than the display object 410b in the non-displayed display range 78. However, the present disclosure is not limited to such an example, and for example, in a case in which speech including a keyword indicating the past such as "red one a few minutes ago" or "one with 6 cans viewed a few minutes ago" is collected, the selecting unit 106 may select the display object in the displayed display range with a higher priority than the display object in the current display range. Further, in a case in which speech for giving an instruction to select a display object estimated not to be viewed by the user such as "Can I see 6 XX cans?" is collected, the selecting unit 106 may select the display object in the non-displayed display range with a higher priority than the display object in the current display range.

2-1-5-3. Selection Example by Consecutive Speech

Further, in a case in which the speech is performed consecutively, the selecting unit 106 may consecutively select the display object corresponding to the speech as long as the voice recognition result of the speech satisfies a predetermined condition each time the speech is collected. For example, each time the speech is collected, the selecting unit 106 first determines whether or not the voice recognition result of the speech satisfies a predetermined condition. Further, the selecting unit 106 select the display object corresponding to the voice recognition result of the speech from among a plurality of display objects (in the display range of the selection target) for each of all segments of speech acquired before a timing at which it is initially determined that the voice recognition result of the speech does not satisfy a predetermined condition.

Figure 16:
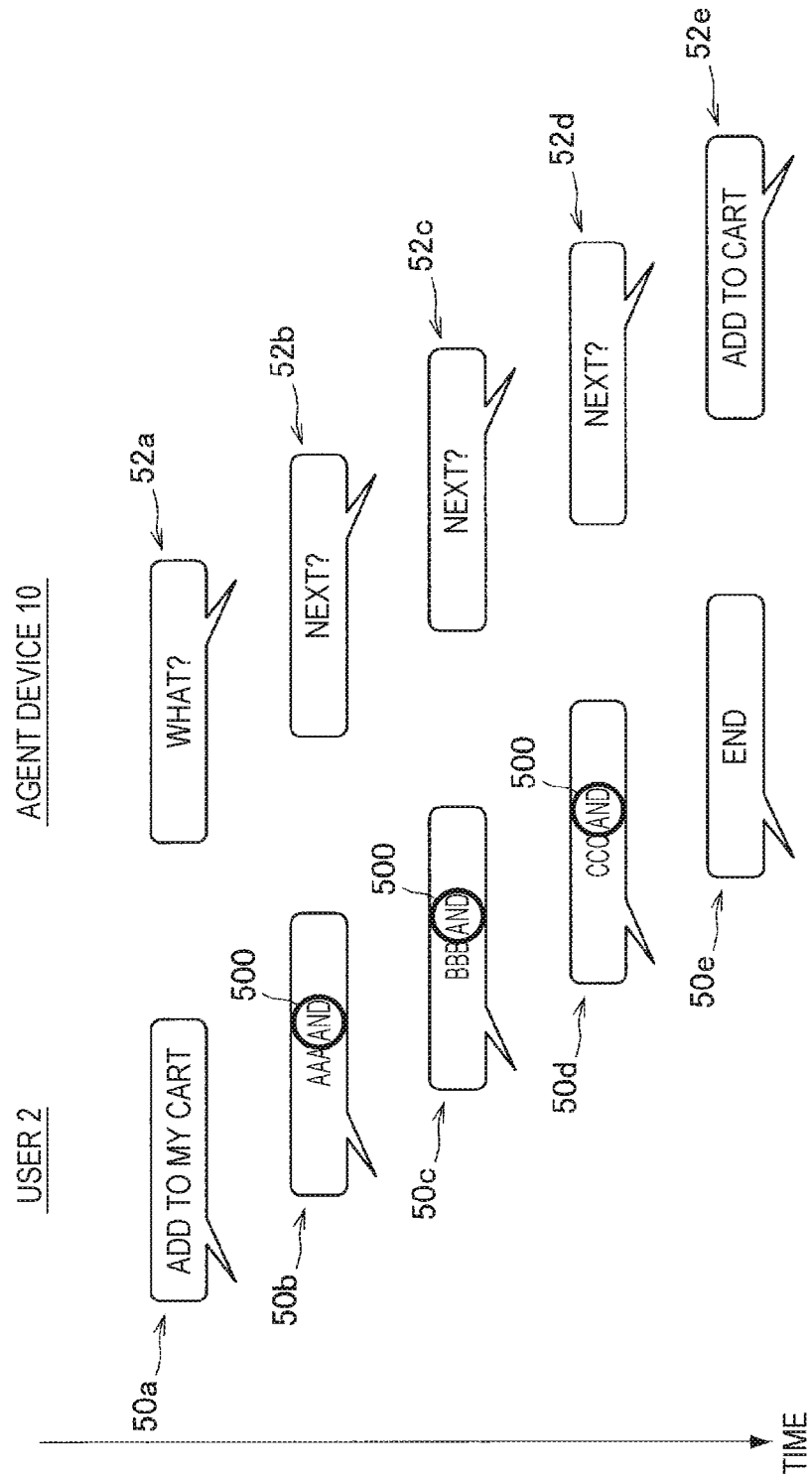
FIG. 16 is an explanatory diagram illustrating an example of speech for successively selecting a display object according to the embodiment.

Here, the above functions will be described in further detail with reference to FIG. 16. As illustrated in FIG. 16, the user performs, for example, predetermined speech 50a indicating the start such as "add to my cart." Thereafter, the user consecutively performs speech including a production name desired to be selected and "and" such as speech 50b "AAA and," speech 50b "BBB and," and speech 50c "CCC and." In this case, each time the speech 50 including "and" at the end of the word is consecutively acquired, the selecting unit 106 selects the display object corresponding to the voice recognition result of the speech 50 from among a plurality of display objects in the display range of the selection target, and temporarily stores the identification information of the selected display object in, for example, the storage unit 130. Thereafter, for example, in a case in which predetermined speech 50e indicating the end such as "end" is detected as illustrated in FIG. 16, the selecting unit 106 finally decides all the display objects temporarily stored before the detection timing as the display objects selected by the user.

2-1-5-4. Modified Example

Further, as a modified example, in a case in which, for example, speech "this" is collected while one of a plurality of display objects currently being displayed by the display unit 126 is pointed (for example, touched) with a finger, and the selecting unit 106 may also select a display object of a pointing destination of the finger. In this case, the selecting unit 106 may further perform a process of adding the product corresponding to the selected display object to the cart (for example, storing it in a storage area for the "cart").

Generally, in the touch manipulation, a touch to select the display object and a touch for a manipulation to add to the cart are necessary. On the other hand, according to the modified example, it is possible to reduce a manipulation time as compared with the normal touch manipulation since it is possible to add a desired display object to the cart with only one touch.

{2-1-6. Communication Unit 120}

The communication unit 120 performs transmission and reception of information with other devices via, for example, the communication network 22. For example, the communication unit 120 transmits the search request for extracting the display object corresponding to the voice recognition result of the collected speech to the server 20 under the control of the selecting unit 106. Further, the communication unit 120 receives the search result list from the server 20.

{2-1-7. Sensor Unit 122}

The sensor unit 122 may include, for example, an image sensor (camera) and/or a depth sensor. For example, a camera included in the sensor unit 122 captures a video in front of the camera at a predetermined timing (for example, at predetermined time intervals). Further, the depth camera included in the sensor unit 122 measures a distance to each object located in front of the depth camera. Further, the sensor unit 122 may further include a triaxial acceleration sensor, a gyroscope, a magnetic sensor, or the like.

{2-1-8. Sound Collecting Unit 124}

The sound collecting unit 124 is, for example, a microphone. The sound collecting unit 124 detects an external sound (air vibration) and converts the detected sound into an electric signal. Further, the sound collecting unit 124 transmits the converted signal to the control unit 100.

{2-1-9. Display Unit 126}

The display unit 126 displays an image under the control of the output control unit 108. For example, in a case in which the display unit 126 includes a projector, the display unit 126 projects an image in a projection direction of the projector under the control of the output control unit 108. Further, in a case in which the display unit 126 includes a display, the display unit 126 displays an image on the display under the control of the output control unit 108.

{2-1-10. Voice Output Unit 128}

The voice output unit 128 may include a speaker. The voice output unit 128 outputs a voice in accordance under the control of the output control unit 108.

{2-1-11. Storage Unit 130}

The storage unit 130 stores various kinds of data and various kinds of software. For example, as illustrated in FIG. 5, the storage unit 130 stores the process definition DB 30.

2-2. Flow of Processing

The configuration of the present embodiment has been described above. Then, a flow of a process according to the present embodiment will be described with reference to FIGS. 17 and 18. Further, here, an example of a flow of a process in a situation in which the user searches for a desired product from a plurality of products registered in the server 20 by speaking toward the agent device 10 will be described.

Figure 17:
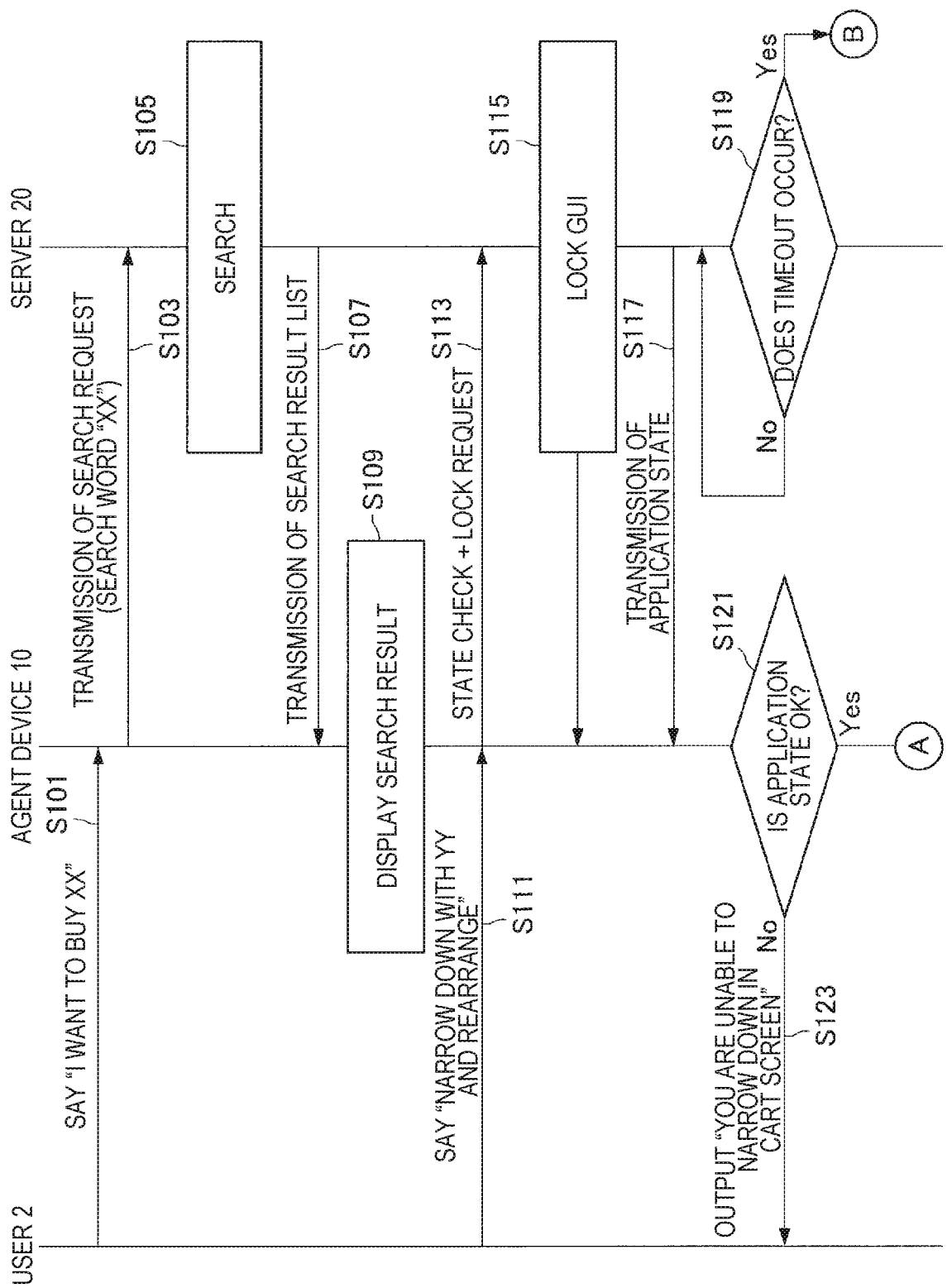
FIG. 17 is a sequence diagram illustrating a part of a flow of a process according to the embodiment.

As illustrated in FIG. 17, first, a user 2 speaks "I want to buy XX" toward the agent device 10. Then, the voice recognizing unit 104 of the agent device 10 performs the voice recognition on the collected speech (S101).

Then, the selecting unit 106 sets the keyword "XX" specified from the voice recognition result in S101 as the search word and generates the search request. Then, the communication unit 120 transmits the generated search request to the server 20 (S103).

Thereafter, the server 20 searches a database in which information related to a plurality of products is registered on the basis of the received search request (S105). Then, the server 20 transmits the search result list to the agent device 10 (S107).

Thereafter, the display unit 126 of the agent device 10 displays the received search result list under the control of the output control unit 108 (S109).

Thereafter, the user 2 speaks toward the agent device 10 "narrow down with YY and rearrange." Then, the voice recognizing unit 104 of the agent device 10 performs the voice recognition on the collected speech, and analyzes the meaning of the speech (S111).

Then, the communication unit 120 transmits a state confirmation and a GUI lock request to the server 20 under the control of the control unit 100 (S113).

Thereafter, the server 20, for example, locks all the GUIs on the basis of the received lock request (S115). Then, the server 20 transmits state information of an application to the agent device 10 (S117). Thereafter, the server 20 is on standby until a predetermined period of time elapses (S119). In a case in which a predetermined period of time elapses (Yes in S119), the server 20 performs a process of S137 to be described later.

Further, after S117, the control unit 100 of the agent device 10 determines whether or not a value indicated by the received state information is "OK" (S121). In a case in which the value indicated by the state information is not "OK" (for example, "NG") (No in S121), the voice output unit 128 outputs a voice indicating that the process corresponding to the speech of S111 is not executable such as, for example, "You are unable to narrow down in cart screen" under the control of output control unit 108 (S123). Further, the present process ends.

Here, a flow of a process in a case in which the value indicated by the state information is "OK" in S121 (Yes in S121) will be described with reference to FIG. 18.

Figure 18:
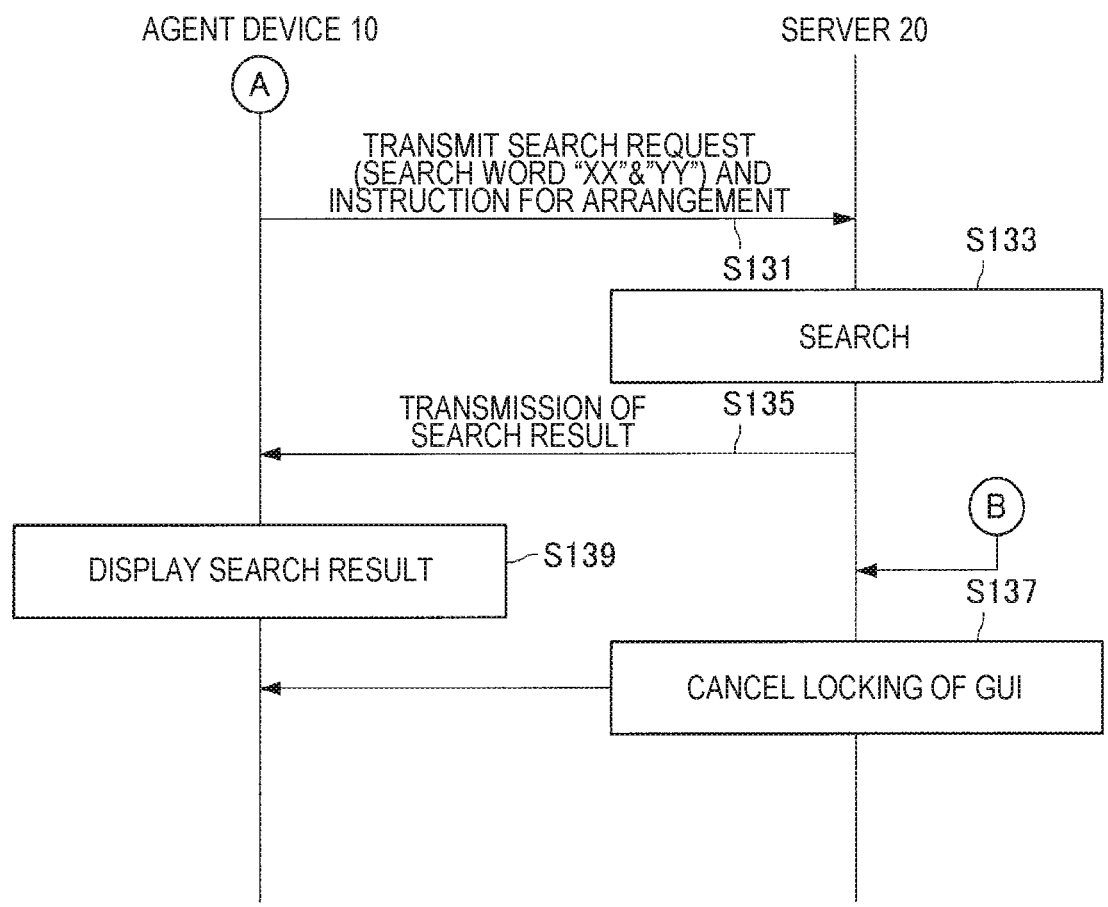
FIG. 18 is a sequence diagram illustrating a part of a flow of a process according to the embodiment.

As illustrated in FIG. 18, the selecting unit 106 of the agent device 10 sets the keyword "XX" specified from the voice recognition result of S101 and the keyword "YY" specified from the voice recognition result of S111 as the search word and generates the search request.

Further, the output control unit 108 generates instruction information for causing the display objects of the search result to be displayed in an arrangement according to the voice recognition result of S111. Then, the communication unit 120 transmits the generated search request and the instruction information to the server 20 (S131).

Thereafter, the server 20 searches the above database on the basis of the received search request (S133). Then, the server 20 transmits the search result list to the agent device 10 (S135).

After S135 or in a case in which the condition of S119 is satisfied, the server 20 cancels the locking of all the GUIs locked in S115 (S137).

Further, after S135, the display unit 126 of the agent device 10 displays the received search result list under the control of the output control unit 108 (S139).

2-3. Effects

{2-3-1. Effect 1}

As explained above, according to the present embodiment, the agent device 10 can acquire the collected speech, then select the display object from among a plurality of display objects on the basis of a plurality of display objects in the display range of the selection target corresponding to the current display range and the speech, and change a display form of a plurality of display objects. Therefore, since the process is executed adaptively to the relation between the collected speech and a plurality of display objects in the display range of the selection target, the convenience of the user is high. For example, the user can easily select a desired display object from among a plurality of display objects being currently viewed by natural speech. Further, even in a case in which the user is an elderly person or the like, the user can select a desired display object by natural speech, and thus more users can easily utilize the EC.

{2-3-2. Effect 2}

Further, in general, in the display screen including the GUI button (for example, a cart button 412 illustrated in FIG. 9), since the user is likely to accidentally press the GUI button at the time of scroll manipulation, the GUI button is often set to be invalid at the time of scroll manipulation. Therefore, if the scroll manipulation is not temporarily stopped, it may be inconvenient since the user is unable to select a desired GUI button. Further, for example, since a moving distance is large in a situation in which a distance between a position of the hand performing the scroll manipulation and a desired GUI button is large, it is difficult to manipulate. In particularly, in a case in which the agent device 10 is a portable device with a display, the operation may become more unstable.

On the other hand, according to the present embodiment, since it is possible to select the display object by speech, it can be expected that an erroneous manipulation does not occur during the scroll manipulation. For example, in a case in which the speech such as "add XXX to my cart" is collected, the agent device 10 can accurately store the product corresponding to the speech in the cart. Further, even in a case in which the GUI button corresponding to the desired product is outside the display range during the scroll manipulation, there is an advantage in that the user can accurately select the product by speech without changing the current display range. Further, according to the present embodiment, even in a case in which the agent device 10 is a portable device with a display, the user can stably perform a desired manipulation.

{2-3-3. Effect 3}

Further, according to the present embodiment, a manipulation is easy when a site is switched as compared with the normal touch manipulation. For example, in a case in which the user desires to search for character strings displayed at a site A at a site B, in the normal touch manipulation, it is necessary for the user to temporarily copy the character string and then paste the character string to a corresponding position at the site B. On the other hand, according to the present embodiment, when the user speaks, for example, "check XXX at site B" toward the agent device 10, the corresponding character string (that is, XXX) can be searched for at the site B, and thus the operation is easy.

{2-3-4. Effect 4}

Further, according to the present embodiment, the search manipulation is easy while the web page including the search window is being displayed as compared with the normal touch manipulation. For example, in a case in which the user desires to use the character string in the display range currently being displayed as the search key, and the search window is located outside the current display range, in the normal touch manipulation, it is necessary for the user to first copy the corresponding character string and then scroll the display range to the position of the search window, and thus the manipulation is troublesome. On the other hand, according to the present embodiment, since the user can search for the corresponding character string only by speaking "search for XXX" toward the agent device 10 without changing the display range, the manipulation is easy.

2-4. Application Example

The present embodiment has been described above. By the way, while a certain display screen is being browsed, the user may desire to do another task or think that it is necessary to do another task due to influence from content being displayed on the display screen.

Next, application examples of the present embodiment will be described. As will be described later, according to the present application example, if speech to execute another task is collected while a certain display screen is being displayed, the agent device 10 can process another task in parallel while displaying the display screen. Further, description of content overlapping with the above description will be omitted below.

2-4-1. Application Example 1

(2-4-1-1. Output Control Unit 108)

First, an application example 1 will be described. The output control unit 108 according to the application example 1 can specify information of a response to the speech on the basis of one or more display objects in the current display range and a result of semantic analysis of the collected speech and output the specified information of the response.

Here, the above content will be described in further detail with reference to FIG. 19. In the example illustrated in FIG. 19, it is assumed that the user performs the speech 50 of "Where is manufacturer of ABC?" in a situation in which the display object 410a including the character string "ABC" is displayed on the display screen 40. In this case, the selecting unit 106 of the agent device 10 first selects the display object 410a in which the character string "ABC" is included in the product name from the meta information associated with each of one or more display objects in the current display range. Then, the output control unit 108 specifies the response ("XDZ" in the example illustrated in FIG. 19) corresponding to the inquiry indicated by the speech 50 on the basis of the meta information of the display object 410a, and causes the voice 52 indicating the specified response to be output to the voice output unit 128.

Further, instead of specifying the response to the inquiry from the meta information of the display object 410a, for example, the output control unit 108 can make an inquiry to the question and specify the response to the inquiry to the server 20.

(2-4-1-2. Voice Recognizing Unit 104)

Further, in a case in which the character string corresponding to the phoneme string specified from the collected speech is present in the current display range, each time the phoneme string is specified, the voice recognizing unit 104 according to the application example 1 can perform the voice recognition so that the phoneme string is converted into the character string each time.

For example, each time the speech including "flour" such as "What is flour" and "Make note of flour" is collected while the search result display screen 40 illustrated in FIG. 6 is being displayed, the voice recognizing unit 104 converts all phoneme strings corresponding to "flour" specified from the speech into the same character string ("flour"). Accordingly, the user can efficiently perform a plurality of tasks.

2-4-2. Application Example 2

Figure 20:
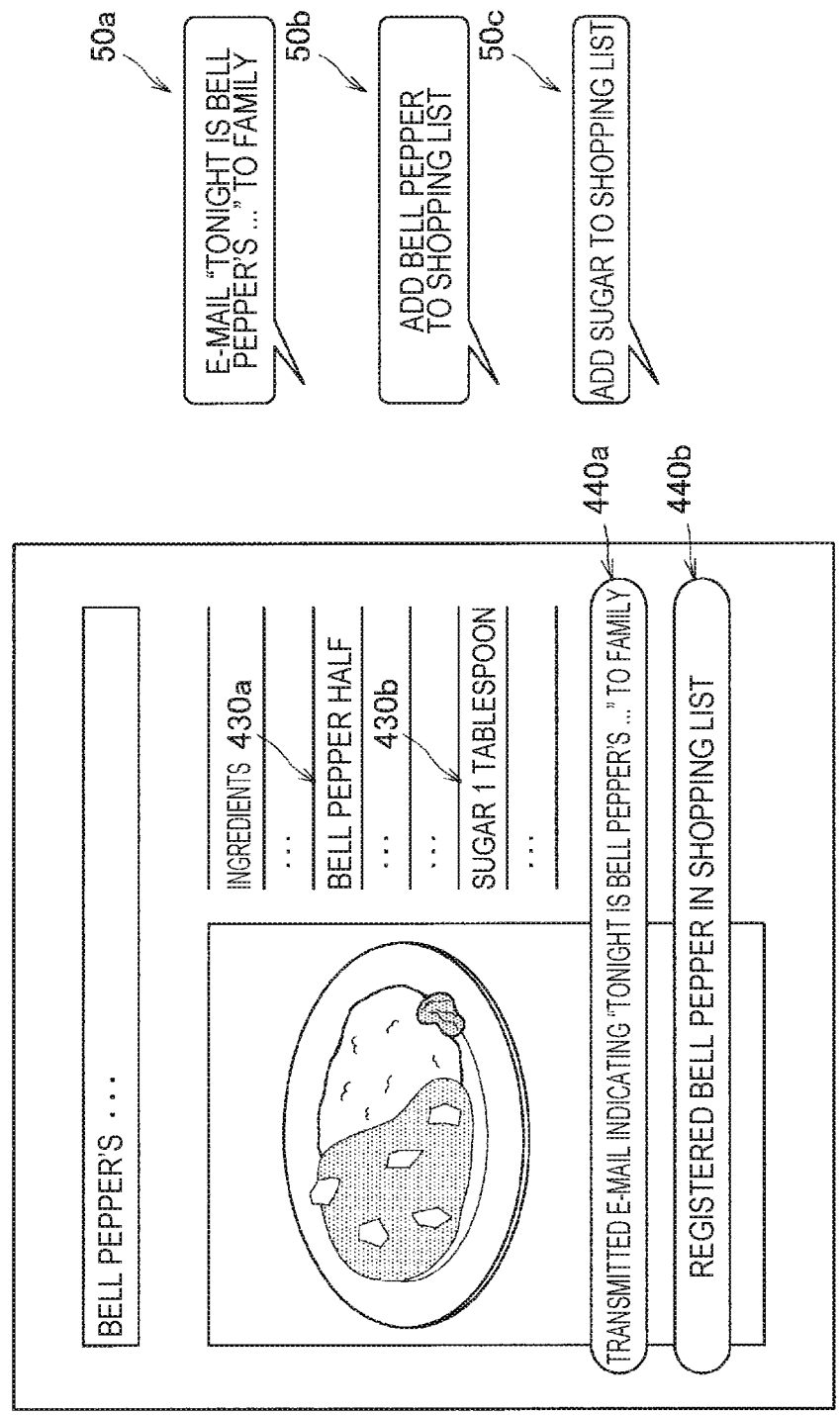
FIG. 20 is an explanatory diagram illustrating an example in which a plurality of tasks are executed in parallel on the basis of speech according to an application example of the embodiment.

Next, an application example 2 will be described. FIG. 20 is an explanatory diagram illustrating an example of a process executed on the basis of acquisition of collected speech by an agent device 10 according to the application example 2. As illustrated in FIG. 20, for example, it is assumed that a web page 40 of a cooking recipe is currently being displayed by the display unit 126. Further, it is assumed that, when a character string 430a "bell pepper" included in the web page 40 is viewed, the user transmits an e-mail of text indicating "Tonight is bell pepper's . . . " to a family, and then performs speech 50a "email 'Tonight is bell pepper . . . ' to family" to the agent device 10. In this case, the agent device 10 performs a process of transmitting the e-mail of the text to the family without transitioning to another screen. Then, if the process is completed, the agent device 10 displays a GUI auxiliary screen 440a including, for example, a character string "transmitted e-mail indicating 'tonight is bell pepper's . . . ' to family" as illustrated in FIG. 20 on the web page 40.

Thereafter, it is assumed that the user desires to register "bell pepper" in a shopping list, and performs, for example, speech 50b "adds bell pepper to shopping list" toward the agent device 10. In this case, the agent device 10 performs a process of registering "bell pepper" in the shopping list without transitioning to another screen. Further, if the process is completed, the agent device 10 displays a GUI auxiliary screen 440b including, for example, the character string "registered bell pepper in shopping list" on the web page 40.

(2-4-2-1. Flow of Process)

Then, a flow of a process according to the application example 2 will be described with reference to FIG. 21. Further, FIG. 21 illustrates an example of a flow of a process corresponding to a situation illustrated in FIG. 21.

Figure 21:
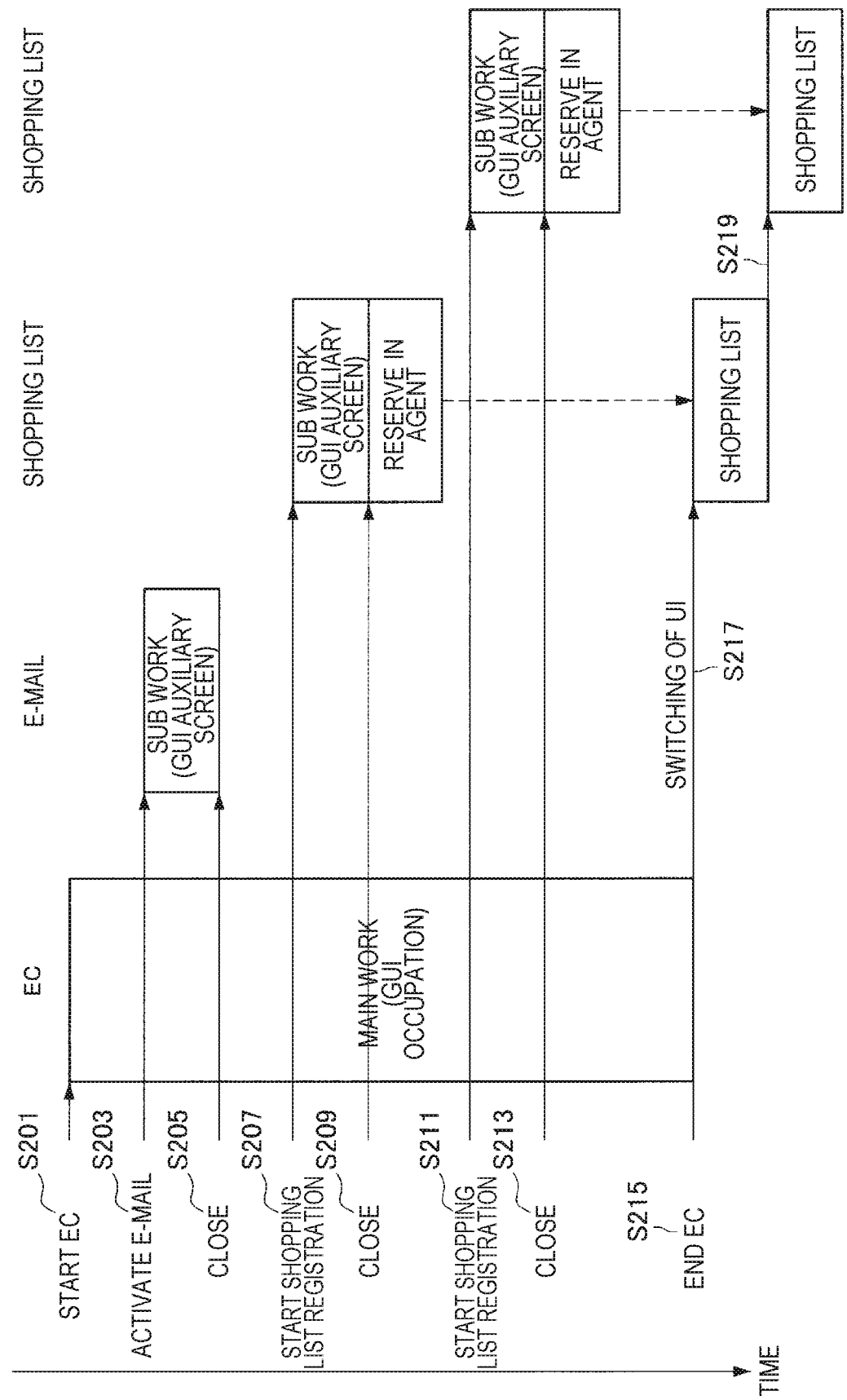
FIG. 21 is an explanatory diagram illustrating a flow of a process corresponding to a situation illustrated in FIG. 20.

As illustrated in FIG. 21, first, the agent device 10 activates, for example, the EC application on the basis of the acquisition of the voice data of the speech. Further, the display unit 126 of the agent device 10 displays an EC application display screen (hereinafter referred to as an EC application screen) under the control of the output control unit 108 (S201). Further, the agent device 10 continues to display the EC application screen without performing the screen transition up to S215 to be described later.

Thereafter, in a case in which the voice data of the speech 50a illustrated in FIG. 20 is acquired, the control unit 100 of the agent device 10 activates an e-mail application (S203). Further, if an e-mail transmission process is completed, the display unit 126 displays the GUI auxiliary screen 440a illustrated in FIG. 20 on the EC application screen, for example, for a predetermined period of time under the control of the output control unit 108 (S205).

Thereafter, in a case in which the voice data of the speech 50b illustrated in FIG. 20 is acquired, the control unit 100 of the agent device 10 activates the shopping list (S207). Further, in a case in which the process of registering the shopping list is completed, the display unit 126 displays the GUI auxiliary screen 440b illustrated in FIG. 20 on the EC application screen for a predetermined period of time under the control of the output control unit 108 (S209).

Further, the agent device 10 temporarily stacks (stores) information of a work related to the registered shopping list in the storage unit 130. Accordingly, it is possible to automatically display a main screen of the shopping list after the EC application screen ends as will be described later.

Thereafter, if the voice data of the speech 50c illustrated in FIG. 20 is acquired, the agent device 10 performs a process substantially similar to the process of S207 to S209 (S211 to S213).

Figure 22:
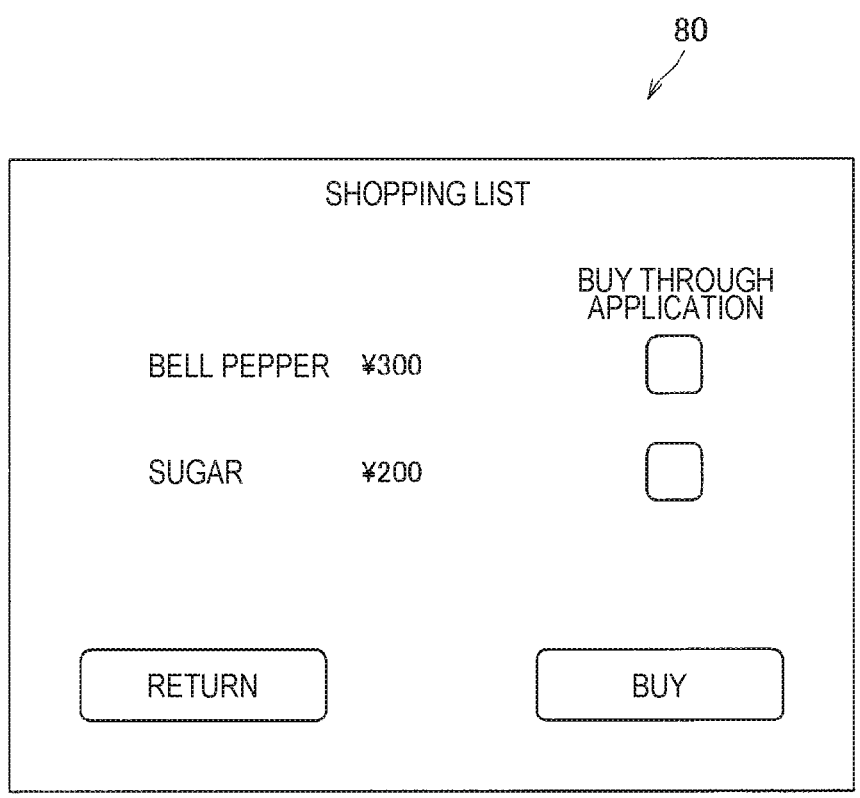
FIG. 22 is a diagram illustrating a display example of a main screen of a shopping list according to the application example.

Thereafter, for example, if the user performs a manipulation to end the display of the EC application screen, for example, the output control unit 108 of the agent device 10 causes screen transition from the EC application screen to a main screen 80 of a shopping list stacked in S209 as illustrated in FIG. 22 to be performed (S217).

Thereafter, in a case in which the stacked work corresponding to the speech 50b (for example, performing an input to decide whether or not to purchase "a bell pepper") ends, the output control unit 108 of the agent device 10 updates display content of the main screen 80 of the shopping list. Then, the stacked work corresponding to the speech 50c is started (S219).

(2-4-2-2. Effect)

As described above, according to the application example 2, when the user performs speech to execute another task, it is possible to perform a plurality of tasks in parallel in the same display screen with no transition of the display screen being currently displayed. For example, the user can perform sub tasks sequentially without stopping a main task.

2-4-3. Modified Example

Further, the present application example is not limited to the above example. For example, in a case in which information related to music (an image, a character string, or the like) is included in a web page being displayed, and speech for giving an instruction to reproduce the music is collected, the agent device 10 may reproduce the music on the basis of the voice recognition result of the speech.

Further, in a case in which an advertisement is included in the web page being displayed, and speech for giving an instruction to add the product corresponding to the advertisement into the shopping list is collected, the agent device 10 may add the corresponding product to the shopping list on the basis of the voice recognition result of the speech.

Further, in a case in which speech for giving an instruction indicating that the search result related to the character string included in the web page being displayed is output by voice, the agent device 10 may search for the character string on the basis of the voice recognition result of the speech and output the search result by voice.

Further, when the voice in which the user reads a sentence of a first language being displayed by the display unit 126, the agent device 10 may translate the voice recognition result of the voice in a second language (for example, a preset language) and output the voice corresponding to a translation result.

Further, when a message is arrived from another user on a social networking service (SNS) while an SNS display screen is being displayed, the agent device 10 may read the message automatically. Thereafter, in a case in which speech of a response to the message is collected, the agent device 10 may further automatically transmit a message obtained from the voice recognition result of the speech to another user.

(Effect)

In general, since a link is established between web pages, if the user traces the link, a task being currently performed is interrupted. On the other hand, according to the modified examples, even when the web page is displayed, for example, the user can give an instruction to the agent device 10 by speech, and thus it is possible to perform another task without interrupting the task.

3. Hardware Configuration

Figure 23:
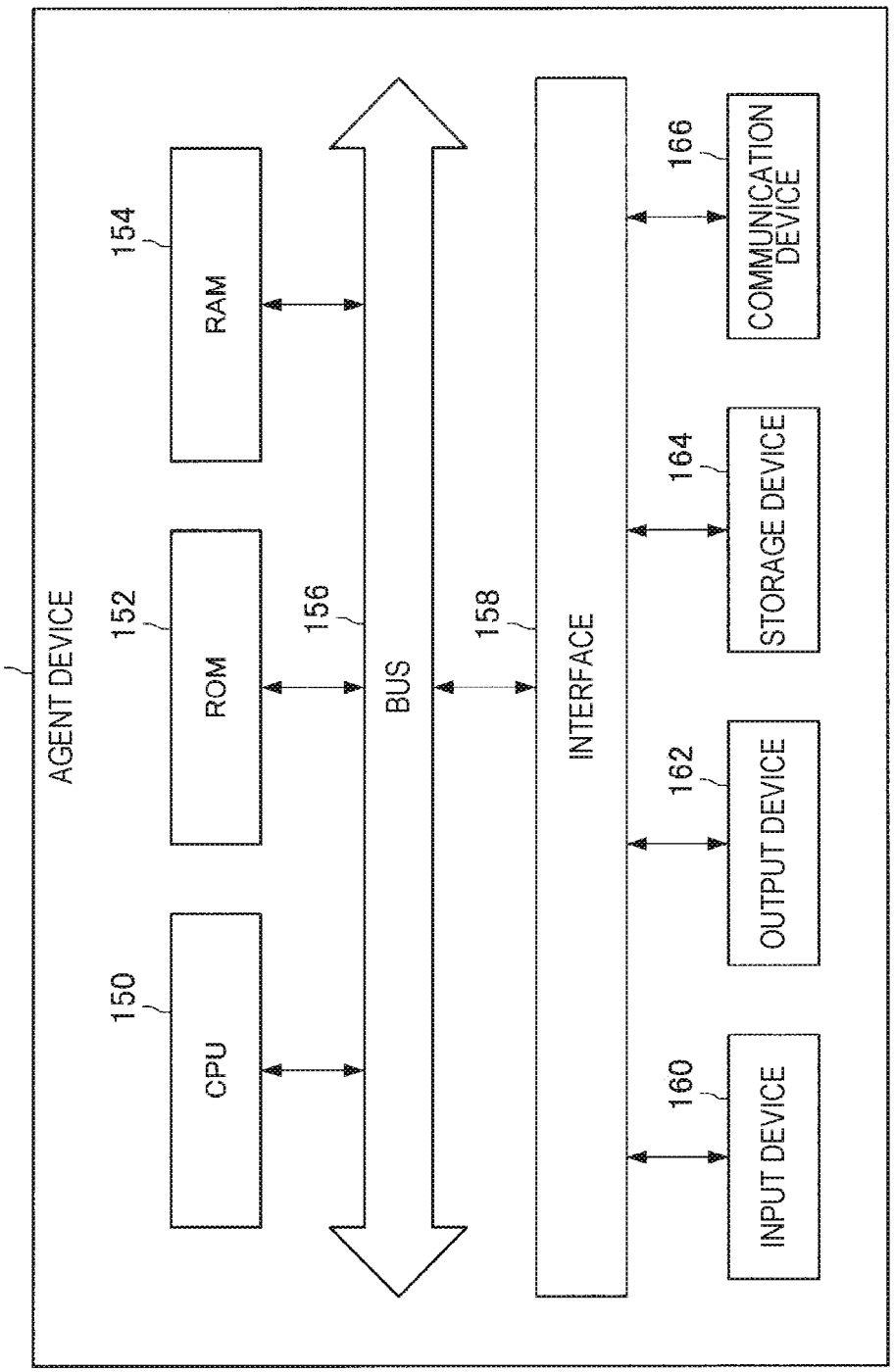
FIG. 23 is an explanatory diagram illustrating a hardware configuration of an agent device 10 according to the embodiment.

Next, a hardware configuration of the agent device 10 according to the present embodiment will be described with reference to FIG. 23. As illustrated in FIG. 23, the agent device 10 includes a CPU 150, a Read Only Memory (ROM) 152, a RAM 154, a bus 156, an interface 158, an input device 160, an output device 162, a storage device 164, and a communication device 166.

The CPU 150 functions as an arithmetic processing unit and a control unit, and controls an overall operation of the agent device 10 in accordance with various kinds of programs. Further, the CPU 150 implements the function of the control unit 100 in the agent device 10. Further, the CPU 150 is constituted by a processor such as a microprocessor.

The ROM 152 stores, for example, control data such as a program, an operation parameter, and the like used by the CPU 150.

The RAM 154 temporarily stores, for example, a program executed by the CPU 150.

The bus 156 is constituted by a CPU bus or the like. The bus 156 connects the CPU 150, the ROM 152, and the RAM 154.

The interface 158 connects the input device 160, the output device 162, the storage device 164, and the communication device 166 to the bus 156.

The input device 160 includes an input unit in which the user inputs information such as, for example, a touch panel, a button, a switch, a lever, a microphone, or the like, an input control circuit that generates an input signal on the basis of an input by user and outputs the input signal it to the CPU 150.

The output device 162 includes a projector or a display device such as a display such as a liquid crystal display (LCD) or an organic light emitting diode (OLED). Further, the output device 162 includes a voice output device such as a speaker.

The storage device 164 is a data storage device functioning as the storage unit 130. The storage device 164 includes, for example, a storage medium, a recording device for recording data in a storage medium, a reading device for reading data from a storage medium, a deletion device for deleting data recorded in a storage medium, and the like.

The communication device 166 is a communication interface constituted by a communication device or the like for establishing a connection with, for example, a communication network 22 or the like. Further, the communication device 166 may be a communication device that supports a wireless LAN, a communication device that supports Long Term Evolution (LTE), or a wire communication device that performs communication in a wired manner. This communication device 166 functions as the communication unit 120.

4. Modified Example

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

4-1. Modified Example 1

For example, it is also considered that the user just adds a product to the cart by speech with no sufficient determination. In this regard, for example, in a case in which the product of the same category is stored in the cart, the agent device 10 may compare a plurality of products and generate a comparison result list. Further, the agent device 10 may compare a learning result of a type of product that the user has purchased in the past with each of a plurality of products stored in the cart and generate a comparison result list. According to the modified example, the agent device 10 can display the comparison list before making a payment for the product. Accordingly, it is possible to give attention to the user so that an unintended product is not purchased.

4-2. Modified Example 2

Further, as another modified example, the agent device 10 can also select a product of a purchase target on the basis of a voice recognition result of speech of the user collected while a video captured, for example, in real time by a camera of the agent device 10 or a camera (hereinafter referred to as an environment camera) installed in another device such as a robot is being displayed and an analysis result of the video. For example, it is assumed that the environment camera photographs a product shelf in a shop or warehouse or in home of the user, and the agent device 10 receives and displays the video captured by the environment camera. In this case, in a case in which the speech of the user such as "I want to buy XXX," "I want to buy detergent," or "middle one" is collected, the agent device 10 can select the product corresponding to the voice recognition result of the speech as the product of the purchase target in the video.

Alternatively, in a situation in which it is estimated that the user is watching the video displayed by a television receiver, the agent device 10 can also select the products of the purchase target on the basis of the voice recognition result of the speech collected while the video is being displayed and information related to the video. For example, in a case in which speech "I want to buy shirt worn by male" is collected when a video of the male is displayed by the television receiver, the agent device 10 may select the shirt worn by the male as the product of the purchase target.

4-3. Modified Example 3

Figure 24:
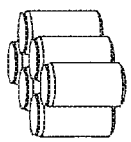
FIG. 24 is an explanatory diagram illustrating an example of a distinction between a slide manipulation for scrolling and a slide manipulation for activating a microphone according to a modified example of the embodiment.

Further, generally, in a case in which a long sentence is spoken, it is inconvenient to speak while performing the scroll manipulation, and the normal touch input may be easier. In this regard, as a modified example, it is desirable that the scroll manipulation and a microphone activation manipulation are set to be distinguished in advance. For example, as illustrated in FIG. 24, a slide manipulation 6a in a vertical direction (longitudinal direction) with respect to the display screen 40 may be set as the scroll manipulation of the display range, and a slide manipulation 6b in a horizontal direction (lateral direction) may be set as a gesture to activate the microphone.

4-4. Modified Example 4

Further, in the above description, the present embodiment has been described mainly focusing on the example applied to the EC, but the present disclosure is not limited to such an example and can be applied to services or applications other than EC. FIG. 25 is an explanatory diagram illustrating an application example in a music reproducing application. As illustrated in FIG. 25, the agent device 10 can generate a playlist on the basis of acquisition of voice data of speech indicating information of a song while a display screen 90 of the music reproducing application is being displayed.

For example, as illustrated in FIG. 25, the user first performs predetermined speech 50a indicating the start such as "generate playlist." Thereafter, the user performs speech including information (a song title or the like) of a song desired to be selected and "and" consecutively such as speech 50b "someday and" or speech 50b "nightlife and." In this case, each time speech 50 including "and" at the end of the word is consecutively acquired, the selecting unit 106 sequentially selects information of a song corresponding to the voice recognition result of the speech 50 from information of a plurality of pieces of songs in a display screen 90, and temporarily stores information of the selected song in, for example, the storage unit 130. Thereafter, for example, as illustrated in FIG. 25, when predetermined speech 50e indicating the end such as "end" is detected, the selecting unit 106 generates the playlist so that all types of songs which are temporarily stored before the detection timing are included. Further, the present disclosure is not limited to the speech of the song name, and the selecting unit 106 can also select a song corresponding to the speech on the basis of the speech such as "song with fast beat," "exciting song," or the like.

4-5. Modified Example 5

Further, the configuration of the information processing system according to the present embodiment is not limited to the example illustrated in FIG. 1. For example, although only one agent device 10 is illustrated in FIG. 1, the present disclosure is not limited to such an example, and a plurality of computers may cooperatively operate to implement the above-described functions of the agent device 10.

4-6. Modified Example 6

Further, the configuration of the agent device 10 according to the present embodiment is not limited to the example illustrated in FIG. 5. For example, one or more of the sensor unit 122, the sound collecting unit 124, the display unit 126, and the voice output unit 128 may not be included in the agent device 10 but may be included in another device with which the agent device 10 can communicate.

4-7. Modified Example 7

Further, although the example in which the information processing device in the present disclosure is the agent device 10 has been described in the above-described embodiment, but the present disclosure is not limited to such an example. For example, the information processing device may be a general-purpose personal computer (PC), a tablet terminal, a game machine, a portable telephone such as a smart phone, a portable music player, a television receiver, a robot, or a wearable device such as a head mounted display (HMD), a headset, a smart watch, or the like.

Further, in a case in which the server 20 includes the respective components included in the control unit 100, the information processing device may be the server 20.

4-8. Modified Example 8

Further, steps in the flow of the process illustrated in FIGS. 17 to 18 need not be necessarily processed in the described order. For example, steps may be processed in a properly changed order. Further, steps may not be processed chronologically but may be processed in parallel or individually. Further, some of steps described may be omitted, or another step may be added.

Further, according to the above embodiment, it is also possible to provide a computer program causing hardware such as the CPU 150, the ROM 152, the RAM 154, and the like to perform the same functions as the components of the agent device 10 according to the above-described embodiment. Further, a storage medium in which the computer program is recorded is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device, including:
an acquiring unit configured to acquire collected speech; and
a process executing unit configured to perform a predetermined process on the basis of the speech and a plurality of display objects in a first display range corresponding to a current display range.

(2)
The information processing device according to (1), in which the first display range includes the current display range.

(3)
The information processing device according to (2), in which the process executing unit selects a display object corresponding to a voice recognition result of the speech from among the plurality of display objects.

(4)
The information processing device according to (3), in which the process executing unit selects the display object corresponding to the voice recognition result of the speech from among the plurality of display objects on the basis of a comparison between information related to each of the plurality of display objects and the voice recognition result of the speech.

(5)
The information processing device according to (3) or (4), in which the process executing unit selects the display object corresponding to the voice recognition result of the speech from among the plurality of display objects on the basis of a result of image analysis of each of the plurality of display objects and the voice recognition result of the speech.

(6)
The information processing device according to any one of (3) to (5),
in which the process executing unit determines whether or not the voice recognition result of the speech satisfies a predetermined condition each time the collected speech is acquired, and the process executing unit selects a display object corresponding to a voice recognition result of each of one or more segments of speech acquired before a first timing at which the voice recognition result of the speech is initially determined not to satisfy the predetermined condition, from among the plurality of display objects.

(7)
The information processing device according to any one of (3) to (6), in which the process executing unit further causes the selected display object to be displayed on a display unit.

(8)
The information processing device according to any one of (3) to (7), in which, in a case in which a plurality of display objects corresponding to the voice recognition result of the speech are selected, the process executing unit further controls an output of information of an inquiry for causing a user to select one or more of the plurality of selected display objects.

(9)
The information processing device according to (2), in which the process executing unit performs voice recognition on the speech on the basis of the plurality of display objects.

(10)
The information processing device according to (9), in which the process executing unit further selects a display object corresponding to a result of the voice recognition from among the plurality of display objects.

(11)
The information processing device according to any one of (2) to (10), in which the current display range is a display range displayed by a display unit at a timing corresponding to a detection timing of a start of the speech.

(12)
The information processing device according to (11), in which the process executing unit changes a display order of a plurality of display objects displayed by the display unit among the plurality of display objects on the basis of a voice recognition result of the speech.

(13)
The information processing device according to (11), in which the process executing unit changes a display classification of a plurality of display objects displayed by the display unit among the plurality of display objects on the basis of a voice recognition result of the speech.

(14)
The information processing device according to any one of (2) to (13), in which the first display range further includes a second display range consecutively displayed by a display unit before a display timing of the current display range.

(15)
The information processing device according to (14), in which the process executing unit selects a display object corresponding to a voice recognition result of the speech from among a plurality of display objects in the current display range with a higher priority than a plurality of display objects in the second display range.

(16)
The information processing device according to any one of (2) to (15), in which the first display range further includes a third display range that is not displayed before a display timing of the current display range but estimated to be displayed by a display unit after the display timing.

(17)
The information processing device according to (16), in which the process executing unit selects a display object corresponding to a voice recognition result of the speech from among a plurality of display objects in the current display range with a higher priority than a plurality of display objects in the third display range.

(18)
The information processing device according to any one of (2) to (17), in which the first display range is consecutively displayed by a display unit along a direction specified by a user.

(19)
An information processing method, including:
acquiring collected speech; and
performing, by a processor, a predetermined process on the basis of the speech and a plurality of display objects in a first display range corresponding to a current display range.

(20)
A program causing a computer to function as:
an acquiring unit configured to acquire collected speech; and
a process executing unit configured to perform a predetermined process on the basis of the speech and a plurality of display objects in a first display range corresponding to a current display range.

REFERENCE SIGNS LIST 10 agent device
20 server
22 communication network
30 process definition DB
100 control unit
102 detection result acquiring unit
104 voice recognizing unit
106 selecting unit
108 output control unit
120 communication unit
122 sensor unit
124 sound collecting unit
126 display unit
128 voice output unit
130 storage unit

The invention claimed is:

1. An information processing device, comprising:
a central processing unit (CPU) configured to:
acquire a first collected speech;
execute a voice recognition process based on the first collected speech and a plurality of display objects in a first display range, wherein
the first display range includes a current display range, a second display range, and a third display range, and
the second display range is consecutively displayed before the current display range and the third display range is to be consecutively displayed after the current display range;
determine that a voice recognition result of the first collected speech satisfies a specific condition, wherein the voice recognition result of the first collected speech corresponds to the voice recognition process;
control a display screen to display a first set of display objects of the plurality of display objects in the current display range;
determine a priority of selection of the plurality of display objects for each of the current display range, the second display range, and the third display range, wherein a priority of selection of a first display object, of the first set of display objects, in the current display range is higher than a priority of selection of a second display object, of the plurality of display objects, in the third display range;
acquire a second collected speech;
rearrange, based on a voice recognition result of the second collected speech, the first set of display objects in an ascending order of a character string corresponding to the first set of display objects;
acquire a third collected speech;
determine that a voice recognition result of the third collected speech dissatisfies the specific condition, wherein the second collected speech is acquired before the third collected speech; and
select the first display object from the first set of display objects based on:
  the determination that the voice recognition result of the first collected speech satisfies the specific condition,
  the determined priority of the selection of the plurality of display objects, and
  the determination that the voice recognition result of the third collected speech dissatisfies the specific condition, wherein the first display object and the second display object correspond to the voice recognition result of the first collected speech.

2. The information processing device according to claim 1, wherein the CPU is further configured to:
compare information related to each of the first set of display objects and the voice recognition result of the first collected speech; and
select the first display object from the first set of display objects based on the comparison.

3. The information processing device according to claim 2, wherein the information related to each of the first set of display objects includes metadata associated with a corresponding display object of the first set of display objects, a result of image analysis of the first set of display objects, and a display position of the corresponding display object of the first set of display objects in the current display range.

4. The information processing device according to claim 1, wherein the CPU is further configured to select the first display object from the first set of display objects based on:
a result of image analysis of each of the plurality of display objects, and
the voice recognition result of the first collected speech.

5. The information processing device according to claim 1, wherein the CPU is further configured to control the display screen to display the selected first display object.

6. The information processing device according to claim 1, wherein the CPU is further configured to:
select the first set of display objects from the plurality of display objects, wherein the first set of display objects corresponds to the voice recognition result of the first collected speech; and
control output of information based on the selection of the first set of display objects, wherein the output of the information corresponds to an inquiry for selection of at least one display object from the selected first set of display objects.

7. The information processing device according to claim 1, wherein
the CPU is further configured to control the display screen to display the current display range at a detection time, and
the detection time corresponds to a start time of utterance of the first collected speech.

8. The information processing device according to claim 7, wherein each display object of the first set of display objects is associated with a specific classification, and
the CPU is further configured to change, based on the first collected speech and the specific classification associated with each display object of the first set of display objects, the display of the first set of display objects.

9. The information processing device according to claim 1, wherein
the CPU is further configured to select, in the current display range, a third display object from the first set of display objects of the plurality of display objects, and
the first set of display objects in the current display range has a higher priority of selection than a second set of display objects, of the plurality of display objects, in the second display range.

10. The information processing device according to claim 1, wherein
the CPU is further configured to select, in the current display range, a third display object from the first set of display objects of the plurality of display objects, and
the first set of display objects in the current display range has a higher priority of selection than a second set of display objects, of the plurality of display objects, in the third display range.

11. The information processing device according to claim 1, wherein the CPU is further configured to control the display screen to display the first display range along a user specified direction.

12. The information processing device according to claim 1, wherein
the CPU is further configured to select the first display object based on user attribute information, and
the user attribute information includes at least one of an age, a height, a weight, or an address.

* * * * *